(12) United States Patent
Van et al.

(10) Patent No.: US 9,807,038 B2
(45) Date of Patent: Oct. 31, 2017

(54) METHOD AND SYSTEM FOR PROVIDING INSTANT MESSAGING SERVICE

(71) Applicant: KAKAO CORP., Seongnam-si, Gyeonggi-do (KR)

(72) Inventors: Seung Hwan Van, Seoul (KR); Ka Ram Han, Seoul (KR); Yong Hyun Kim, Seoul (KR); Sung Hwan Chang, Seoul (KR)

(73) Assignee: Kakao Corporation, Seongnam-si (KR)

( * ) Notice: Subject to any disclaimer, the term of this patent is extended or adjusted under 35 U.S.C. 154(b) by 0 days.

(21) Appl. No.: 13/877,809

(22) PCT Filed: Oct. 11, 2012

(86) PCT No.: PCT/KR2012/008267
§ 371 (c)(1),
(2) Date: Apr. 4, 2013

(87) PCT Pub. No.: WO2013/055125
PCT Pub. Date: Apr. 18, 2013

(65) Prior Publication Data
US 2014/0173003 A1    Jun. 19, 2014

(30) Foreign Application Priority Data
Oct. 11, 2011    (KR) .................. 10-2011-0103752

(51) Int. Cl.
*G06F 15/16*    (2006.01)
*H04L 12/58*    (2006.01)
(Continued)

(52) U.S. Cl.
CPC .............. *H04L 51/04* (2013.01); *G06Q 10/10* (2013.01); *G06Q 30/0241* (2013.01);
(Continued)

(58) Field of Classification Search
CPC .................................................. G06Q 10/107
(Continued)

(56) References Cited

U.S. PATENT DOCUMENTS 6,301,609 B1 * 10/2001 Aravamudan et al. ........ 709/207
6,677,968 B1 *  1/2004 Appelman ..................... 715/853
(Continued)

FOREIGN PATENT DOCUMENTS

EP    2 360 634 A1    8/2011
JP    11-003348 A     1/1991
(Continued)

OTHER PUBLICATIONS

Falls, Jason, Instant Messagaging As A Business Tool, Jan. 17, 2008, socialmediaexplorer.com.*
(Continued)

*Primary Examiner* — Vivek Srivastava
*Assistant Examiner* — Atta Khan
(74) *Attorney, Agent, or Firm* — Baker McKenzie LLP; Hyunho Park

(57) ABSTRACT

Provided is a technique for transmitting and receiving a chat message through a message server. A user may transmit and receive a chat message to and from a friend of a first type and may receive a chat message from a friend of a second type, and receive various chat messages from a company supporting the friend of the second type.

18 Claims, 23 Drawing Sheets

(51) Int. Cl.
- *H04W 4/12* (2009.01)
- *H04L 29/08* (2006.01)
- *H04M 1/725* (2006.01)
- *G06Q 10/10* (2012.01)
- *G06Q 30/02* (2012.01)
- *H04W 4/20* (2009.01)

(52) U.S. Cl.
CPC .......... *H04L 51/046* (2013.01); *H04L 67/306* (2013.01); *H04M 1/72547* (2013.01); *H04W 4/12* (2013.01); *H04L 51/063* (2013.01); *H04M 1/72552* (2013.01); *H04W 4/206* (2013.01)

(58) Field of Classification Search
USPC .......................................................... 709/206
See application file for complete search history.

(56) References Cited

U.S. PATENT DOCUMENTS

| | | | |
|---|---|---|---|
| 7,596,597 B2* | 9/2009 | Liu et al. | 709/204 |
| 7,680,770 B1* | 3/2010 | Buyukkokten et al. | 707/758 |
| 8,027,931 B2* | 9/2011 | Kalaboukis | 705/319 |
| 8,037,150 B2* | 10/2011 | Weaver | H04L 12/1822 455/518 |
| 8,244,815 B1* | 8/2012 | Panzer | 709/206 |
| 8,402,094 B2* | 3/2013 | Bosworth et al. | 709/206 |
| 8,744,976 B2* | 6/2014 | Jagadish | G06Q 10/10 705/319 |
| 8,762,205 B2* | 6/2014 | Narayanaswami | G06Q 10/107 705/14.45 |
| 2003/0135629 A1* | 7/2003 | Sasaki et al. | 709/229 |
| 2003/0204722 A1* | 10/2003 | Schoen et al. | 713/156 |
| 2004/0186766 A1* | 9/2004 | Fellenstein et al. | 705/14 |
| 2005/0050151 A1* | 3/2005 | Mitchell et al. | 709/207 |
| 2005/0055412 A1* | 3/2005 | Kaminsky et al. | 709/207 |
| 2005/0055416 A1* | 3/2005 | Heikes | H04L 51/04 709/207 |
| 2005/0086211 A1* | 4/2005 | Mayer | 707/3 |
| 2005/0159970 A1* | 7/2005 | Buyukkokten et al. | 705/1 |
| 2005/0171954 A1* | 8/2005 | Hull et al. | 707/10 |
| 2005/0289029 A1* | 12/2005 | Li | G06Q 30/04 705/34 |
| 2006/0004911 A1* | 1/2006 | Becker et al. | 709/207 |
| 2006/0026239 A1* | 2/2006 | Chen | H04L 12/581 709/206 |
| 2006/0031295 A1* | 2/2006 | Goodman et al. | 709/206 |
| 2006/0136298 A1* | 6/2006 | Klein et al. | 705/14 |
| 2006/0167991 A1* | 7/2006 | Heikes et al. | 709/204 |
| 2006/0259555 A1* | 11/2006 | Hassounah et al. | 709/206 |
| 2007/0127650 A1* | 6/2007 | Altberg et al. | 379/114.13 |
| 2008/0091517 A1* | 4/2008 | Koonce et al. | 705/10 |
| 2008/0133336 A1* | 6/2008 | Altman | G06Q 30/0207 455/456.1 |
| 2008/0307052 A1 | 12/2008 | Krishnan et al. | |
| 2009/0172112 A1* | 7/2009 | Denner | H04L 51/04 709/206 |
| 2009/0187623 A1* | 7/2009 | Narayanaswami | G06Q 10/107 709/204 |
| 2009/0222328 A1* | 9/2009 | Figueroa et al. | 705/10 |
| 2009/0271370 A1* | 10/2009 | Jagadish | G06Q 10/10 |
| 2009/0319288 A1* | 12/2009 | Slaney et al. | 705/1 |
| 2009/0319908 A1* | 12/2009 | Hummel et al. | 715/739 |
| 2010/0010866 A1* | 1/2010 | Bal et al. | 705/10 |
| 2010/0070335 A1* | 3/2010 | Parekh et al. | 705/10 |
| 2010/0125490 A1* | 5/2010 | Kiciman et al. | 705/14.1 |
| 2010/0161429 A1* | 6/2010 | Mandel | G06Q 30/0277 705/14.73 |
| 2010/0217809 A1* | 8/2010 | Vymenets | G06Q 10/10 709/206 |
| 2010/0330972 A1* | 12/2010 | Angiolillo | H04M 1/274583 455/418 |
| 2011/0047012 A1 | 2/2011 | Sherman | |
| 2011/0153421 A1* | 6/2011 | Novikov et al. | 705/14.52 |
| 2011/0191417 A1* | 8/2011 | Rathod | 709/204 |
| 2012/0078725 A1* | 3/2012 | Maitra | G06Q 30/0269 705/14.66 |
| 2012/0110096 A1* | 5/2012 | Smarr et al. | 709/206 |
| 2012/0143975 A1* | 6/2012 | Brown et al. | 709/206 |
| 2012/0158853 A1* | 6/2012 | Baartman | H04L 51/04 709/206 |
| 2012/0166267 A1* | 6/2012 | Beatty et al. | 705/14.21 |
| 2014/0207880 A1* | 7/2014 | Malkin | G06F 3/016 709/206 |

FOREIGN PATENT DOCUMENTS

| | | | |
|---|---|---|---|
| JP | 2003-281068 A | 10/2003 | |
| JP | 2004-320637 | 11/2004 | |
| JP | 2004320697 A * | 11/2004 | |
| JP | 2005-190287 A | 7/2005 | |
| JP | 2006-191608 | 7/2006 | |
| JP | 2006191608 A * | 7/2006 | H04L 51/04 |
| JP | 2006-524866 A | 11/2006 | |
| JP | 2009-020583 A | 1/2009 | |
| JP | 2009-048602 | 3/2009 | |
| JP | 2009048602 A * | 3/2009 | |
| JP | 2009-522696 | 6/2009 | |
| JP | 2010-524116 | 7/2010 | |
| KR | 10-2002-0074304 A | 9/2002 | |
| KR | 10-2004-0035339 A | 4/2004 | |
| KR | 10-2010-0052795 A | 5/2010 | |
| WO | WO 01/53954 A1 | 7/2001 | |

OTHER PUBLICATIONS

Whelan, David, The Instant Message Market, Dec. 1, 2001, adage.com.*

Office Action received in Japan Application No. 2013-538676, dated Apr. 8, 2014.

Japan Patent Office action on application 2014/140872 dated Apr. 28, 2015; 5 pages.

Extended European Search Report issued in co-pending International Application No. PCT/KR2012008267 dated May 26, 2015.

Office Action issued in co-pending Japanese Application No. 2014-140873 dated May 19, 2015.

* cited by examiner

METHOD AND SYSTEM FOR PROVIDING INSTANT MESSAGING SERVICE

TECHNICAL FIELD

Exemplary embodiments relate to a technique for transmitting and receiving a chat message through a message server.

BACKGROUND ART

With a recent rise in distribution of mobile terminals, mobile terminals are now considered an essential item for modern life. Since, in addition to a voice call service unique to each portable terminal, a variety of data transmission services and various additional services are being made available via mobile terminals, mobile terminals are being transformed into functional multimedia communication devices.

Also, with developments in communication technology, a function of a messenger program previously only available on a conventional personal computer (PC). Accordingly, there is a demand for a chatting method through accessing a central message server.

Generally, an instant messaging service enables transmission and reception of chat messages between users. When a first user transmits a chat message to a second user, the second user receives the chat message from the first user through a message server. The second user also composes a chat message and transmits the chat message to the first user through the message server.

As a number of instant messaging service users is increasing, companies are attempting to earn profits through use of an instant messaging service. For example, a company may display an advertisement on a chat message window or transmit an advertising message to users through the instant messaging service.

DISCLOSURE OF INVENTION

Technical Goals

An aspect of the present invention provides a method and system for providing an instant messaging service that may classify friends into a first type and a second type, and may enable a user to transmit and receive a chat message to and from a friend of the first type and to receive a chat message from a friend of the second type.

Another aspect of the present invention provides a method and system for providing an instant messaging service that may display a chat message sent from a friend of the second type on a mobile terminal of a user absent overlaying the chat message on a user input window.

Still another aspect of the present invention provides a method and system for providing an instant messaging service that may enable a user to be provided with additional information about a second type of friend, to receive, from the second type of friend, a chat message including, for example, a video, coupon information, event information, advertising information, voting interface, and the like, to recommend the second type of friend to another friend, and to receive some recommended friends of second type based on ranking information.

Yet another aspect of the present invention provides a method and system for providing an instant messaging service that may enable a friend of the second type to select some of the registered friends of the friend of the second type automatically and to transmit a message to the selected friends.

Technical Solutions

According to an aspect of the present invention, there is provided a method of operating a mobile terminal for an instant messaging service, the method including storing a list of a plurality of friends of at least one of a first type and a second type, receiving a chat message from a message server through a wireless communication network, determining whether a type of a sender of the received chat message is the first type or the second type, determining whether to display a user input window on a chat window showing the received chat message, based on the type of the sender of the received chat message, and displaying the user input window on the chat window selectively based on the determined result.

The determining of whether the type of the sender of the received chat message is the first type or the second type may include determining whether the type of the sender of the received chat message is the first type or the second type based on an identifier included in information associated with the sender of the received chat message.

The method may further include displaying additional information associated with the sender of the received chat message on the chat window when the type of the sender of the received chat message is the second type, and the additional information associated with the sender may include at least one of a link to a homepage, a picture, an introductory text, a video, ranking information, and a number of friends, associated with the sender.

The method may further include recommending the sender of the received chat message to another user based on a user selection input when the type of the sender is the second type.

The method may further include determining whether the sender of the received chat message is able to perform a virtual communication when the type of the sender is the second type, and the displaying of the user input window on the chat window selectively may include displaying the user input window on the chat window selectively based on the determined result as to whether the sender of the received chat message is able to perform a virtual communication.

The method may further include displaying the list of the plurality of friends such that the friends of the first type and the friends of the second type are distinguished from one another.

According to another aspect of the present invention, there is provided a method of operating a mobile terminal for an instant messaging service, the method including receiving a list of a plurality of recommended friends of at least one of a first type and a second type from a message server, receiving ranking information of the friends of the second type, and providing a friend recommendation window comprising the friends of the second type arranged based on the ranking information of the friends of the second type.

The ranking information of the friends of the second type may be generated based on at least one of an area of interest, a location, a popularity among friends, a number of friends, a number of recommendations, and bidding information, associated with a predetermined user.

The method may further include obtaining a list of registered friends of the predetermined user, obtaining ranking information of friends of the second type among the registered friends in the list, and displaying a list of the friends of the second type arranged based on the ranking information of the friends of the second type.

According to still another aspect of the present invention, there is provided a method of operating a message server for an instant messaging service, the method including storing a list of a plurality of friends of at least one of a first type and a second type for each of a plurality of users, receiving a request for transmission of a chat message from a friend of the second type, selecting a recipient of the chat message among the users as registered friends of the friend of the second type based on at least one of location information, an area of interest, an access state, a number of accesses, a number of used coupons, a number of recommended friends, and a number of read messages, associated with the users, and transmitting the chat message to the selected recipient.

The chat message may include at least one of a video, coupon information, event information, advertising information, and a voting interface.

The method may further include charging for the transmission of the chat message in response to transmitting the chat message.

BEST MODE FOR CARRYING OUT THE INVENTION

Figure 1:
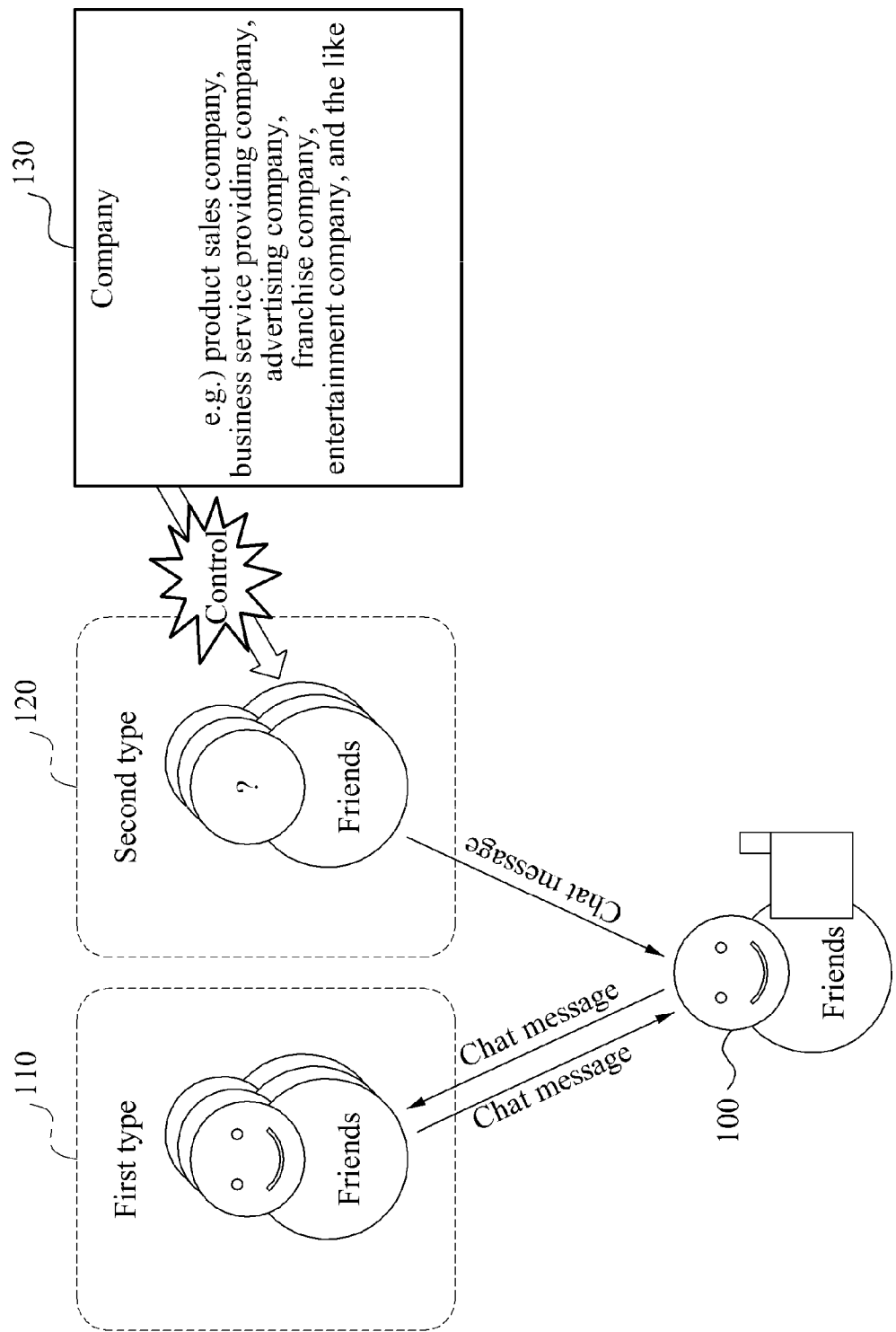
FIG. 1 is a diagram illustrating a method of providing an instant messaging service according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a method of providing an instant messaging service according to an exemplary embodiment of the present invention.

Referring to FIG. 1, a user 100 may receive a chat message from friends, and may write a desired chat message and send the chat message to the friends, through an instant messaging service.

In the present invention, friends may be classified into a first type and a second type. A friend 110 of a first type may be a general friend of the same type as the user 100, and a friend 120 of a second type may be an insubstantial virtual friend that is controlled by a company 130.

For example, the company 130 may include a product sales company, a business service providing company, an advertising company, a franchise company, an entertainment company, and the like. The friend 120 of the second type may send a chat message with a predetermined intention of the company 130 to the user 100. The friend 120 of the second type may include a character for product sales, a customer service advisor for providing a help desk support, a brand in franchise, an account of an entertainer, and the like, according to the purpose of the company 130.

The chat message sent from the friend 120 of the second type may include at least one of a video, coupon information, event information, advertising information, and a voting interface.

Figure 2:
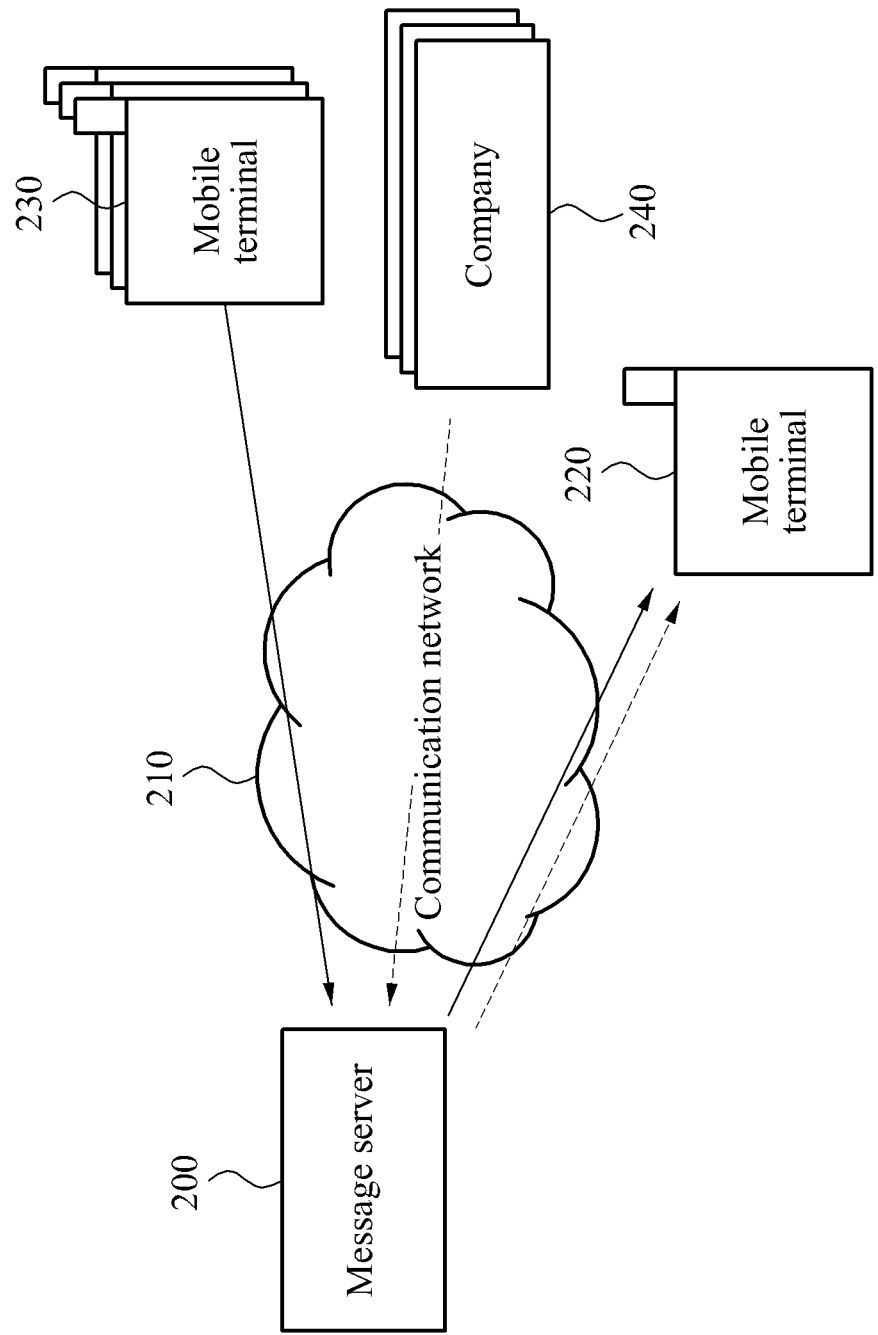
FIG. 2 is a diagram illustrating a network structure of a system for implementing the method of FIG. 1.

FIG. 2 illustrates transmission and reception of a chat message between the user 100, the friend 110 of the first type, and the company 130.

Here, the user 100 has a mobile terminal 220, and the friend 110 of the first type has a mobile terminal 230. The mobile terminals 220 and 230 may have a chat application installed in each of the mobile terminals 220 and 230 through data communication with a message server 200, so that the mobile terminals 220 and 230 may be provided with a chat function of an instant message service. Through the chat application, the mobile terminals 220 and 230 may receive a chat message from the message server 200, display a received chat message, and transmit a chat message to the message server 200.

The friend 110 of the first type may write and send a chat message to the mobile terminal 220 through the message server 200 using the mobile terminal 230. Similarly, a company 240 may write and send a chat message to the mobile terminal 220 through the message server 200 using a communication device, for example, a desktop computer, a server system, a laptop computer, and the like. The chat message sent from the company 240 may correspond to a chat message sent from a friend of the second type, that is, a user pre-registered by the message server 200.

The mobile terminal 220 may display a chat message received from a friend of the first type and a chat message received from a friend of the second type in distinguishable forms. Also, the mobile terminal 220 may enable the user to respond to the chat message received from the friend of the first type and to fail to respond to the chat message from the friend of the second type.

Figure 3:
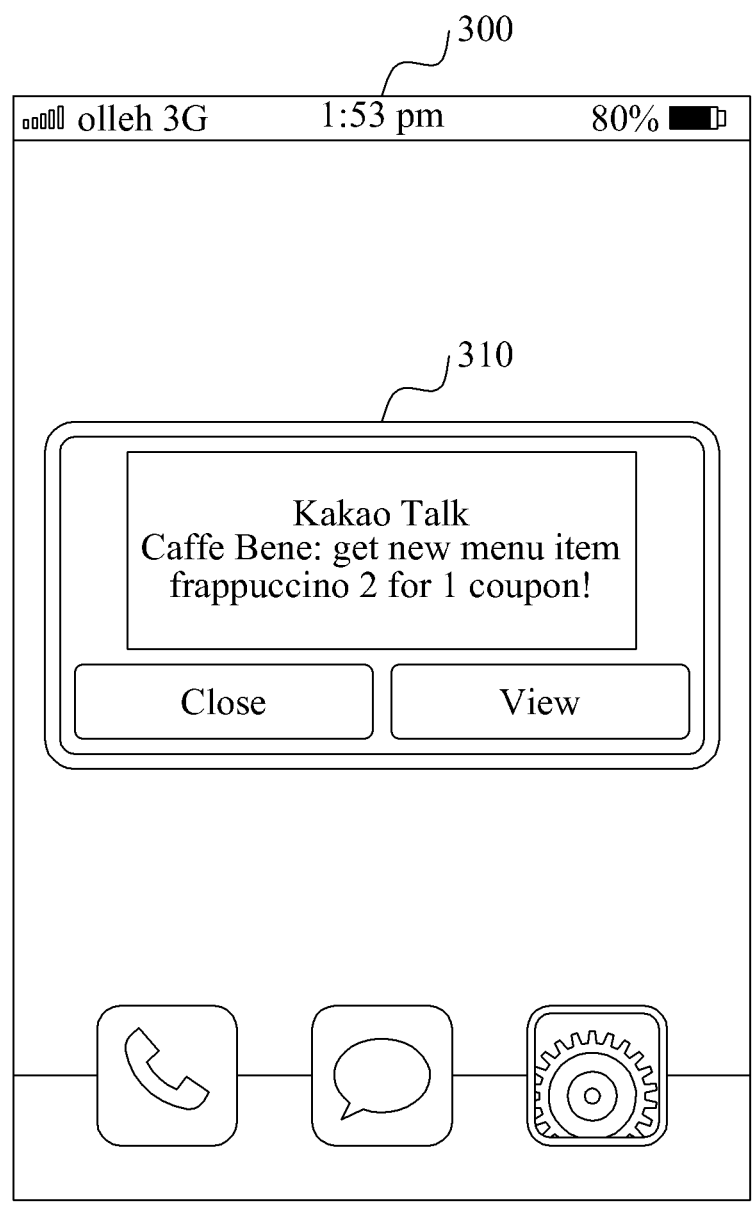
FIGS. 3 through 5 are diagrams illustrating examples of chat windows being displayed on a mobile terminal of FIG. 2.
Figure 4:
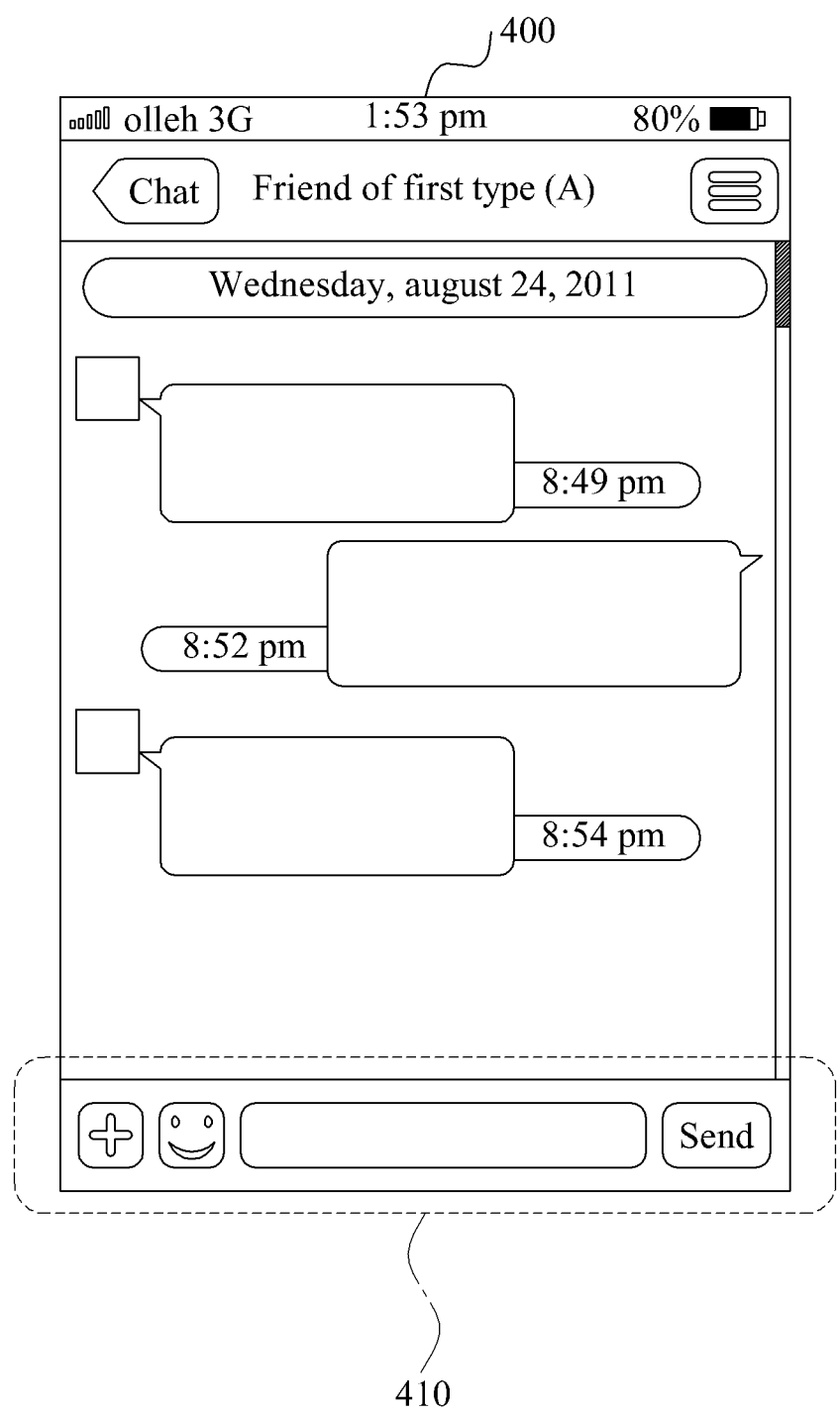
Figure 5:
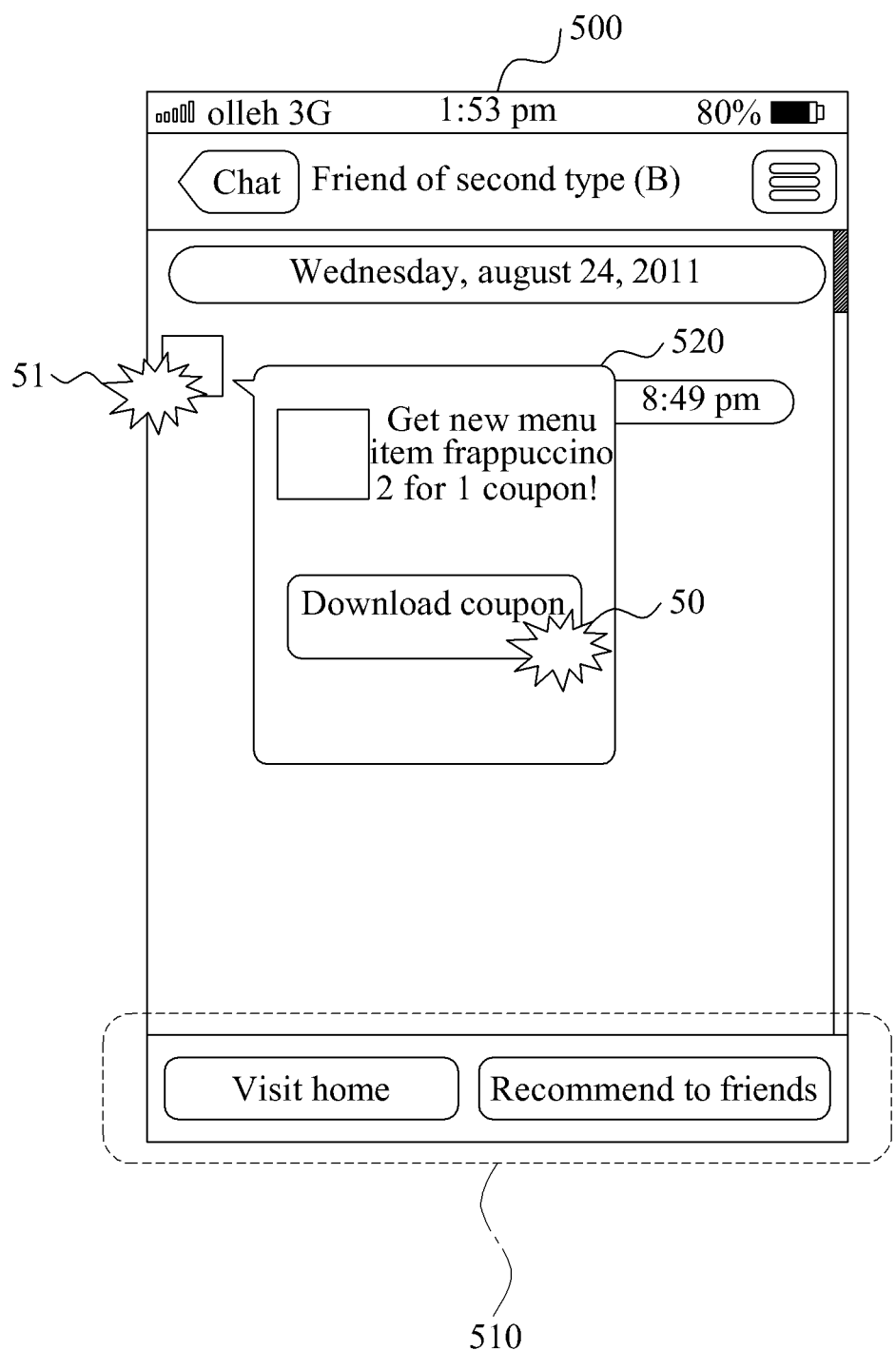

FIGS. 3 through 5 illustrate examples of chat windows being displayed on the mobile terminal 220.

Referring to FIG. 3, the mobile terminal 220 may provide notification of a chat message received from a friend through a pop-up window 310. When a "view" button is executed as a user selection input in the pop-up window 310, the mobile terminal 220 may display the received chat message through a chat window. In the present invention, the mobile terminal 220 may display a chat message received from a friend of the first type and a chat message received from a friend of the second type in a distinguishable form from one another.

In a Case of the Chat Message being Received from the Friend of the First Type:

The mobile terminal 230 may display the received chat message through a display 400 of FIG. 4. On the display 400, the mobile terminal 230 may display a chat window for a one-to-one chat or a group chat with general friends, and may display or overlay a user input window 410 for writing a chat message.

In a Case of the Chat Message being Received from the Friend of the Second Type:

The mobile terminal 230 may display the received chat message through a display 500 of FIG. 5. On the display 500, the mobile terminal 230 may display a chat window for a one-to-one chat with a friend of the second type, and may fail to overlay a user input window for writing a chat message.

The chat message received from the friend of the second type may correspond to a text message and a multimedia message. The chat message may include at least one of a video, coupon information, event information, advertising information, and a voting interface. For example, a chat message 520 may include a content of an event "New Menu item Frappuccino 2 for 1 Coupon", and an image with a "download coupon" link.

Figure 6:
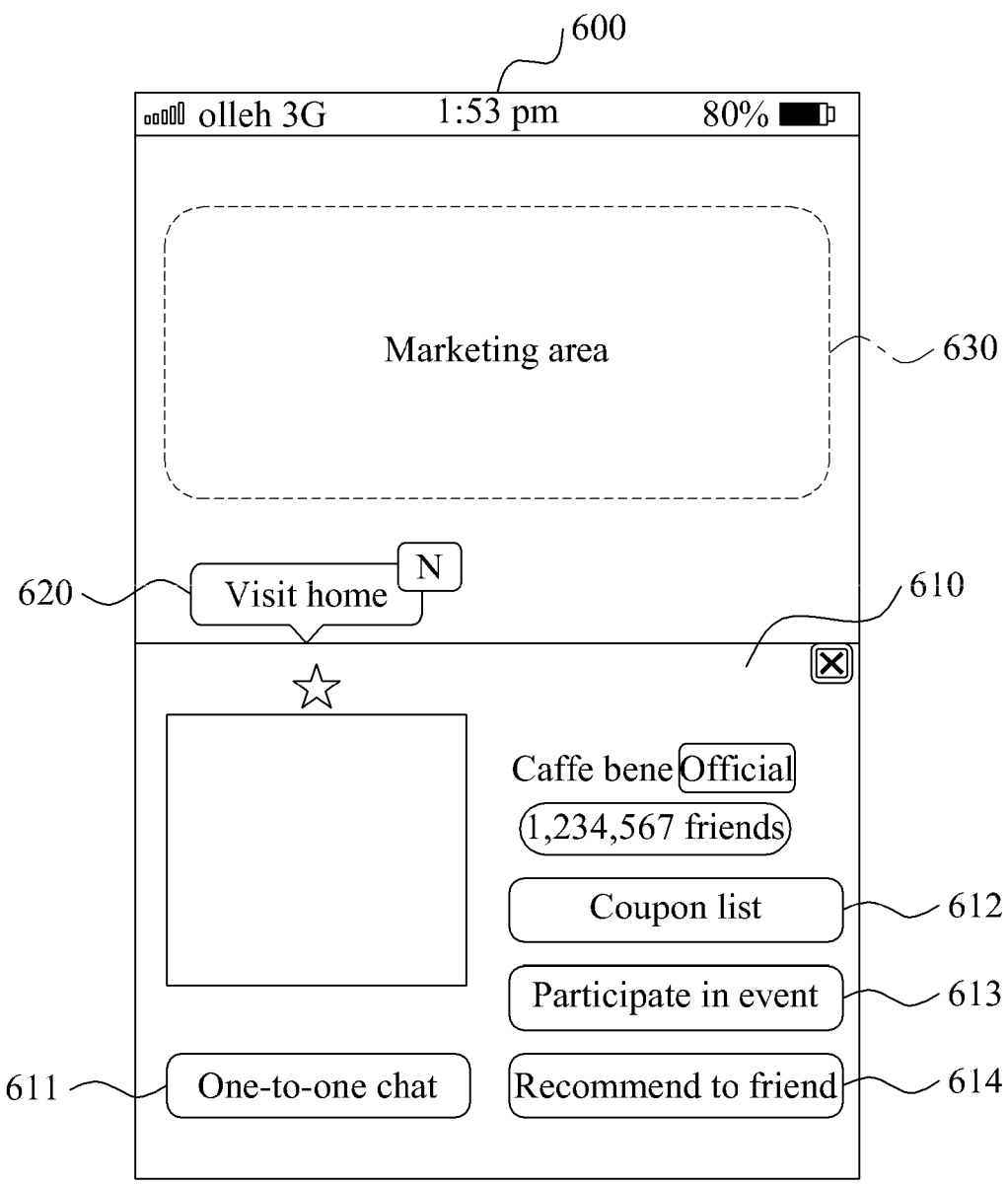
FIGS. 6 through 10 are diagrams illustrating examples of windows being further displayed on a mobile terminal of FIG. 2.

On the display 500, the mobile terminal 230 may further display additional information associated with the friend of the second type, that is, a sender of the chat message. The mobile terminal 230 may overlay the additional information over a portion of the display 500, or may provide the additional information on a next display as shown in FIG. 6. The additional information may include at least one of a link to a homepage of the sender, a picture of the sender, an introductory text of the sender, a video of the sender, ranking information of the sender, and a number of friends of the sender.

In a case in which the friend of the second type supports a virtual communication, a user input window may be overlaid on a chat window. In this instance, the friend of the second type may have a virtual communication using a virtual chatterbot. The chatterbot may provide a proper response to a question or a request by users.

When a user selection input 51 is generated on the display 500, the mobile terminal 230 may provide a display 600 of FIG. 6. The display 600 may include a pop-up window 610 to display additional information associated with the friend of the second type.

The pop-up window 610 may further include a homepage link button 620 for a link to a homepage of the friend of the second type, a chat room link button 611, a coupon list button 612, an "apply" button 613 for participating in an event, and a recommend button 614 for recommending the friend of the second type to another friend. Also, the mobile terminal 230 may include a marketing area 630 for the friend of the second type in an empty area of the display 600 except the pop-up window 610. The marketing area 630 may include at least one of a banner, a video, an image, and text desired by the friend of the second type.

Figure 7:
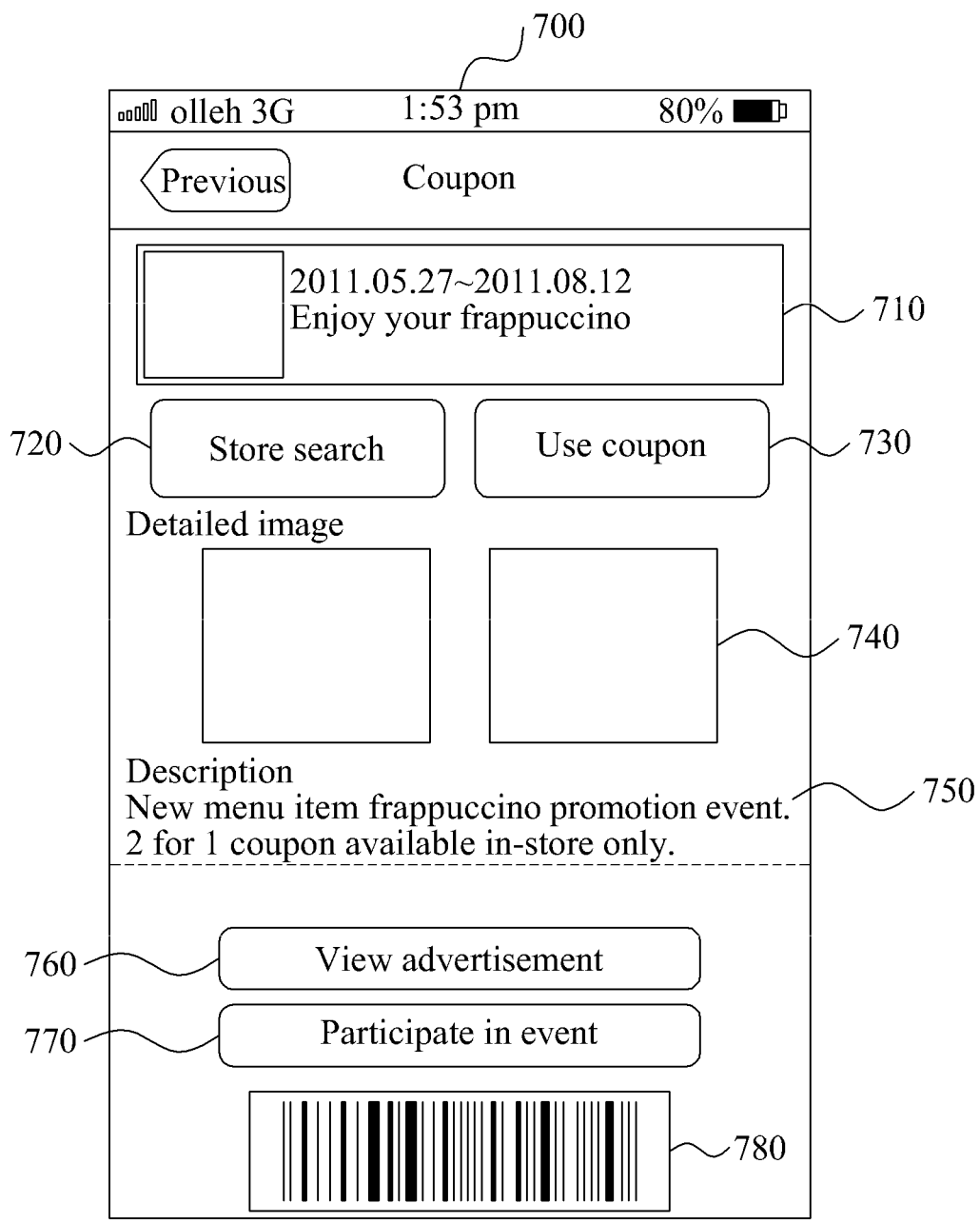

The mobile terminal 230 may further provide a display 700 of FIG. 7. When a user selection input is generated through the "download coupon" link in the chat message 520, the mobile terminal 230 may receive coupon data from the message server and may provide the display 700 based on the received coupon data.

The display 700 may provide the coupon data provided from the friend of the second type. For example, the display 700 may include at least one of a description 710 of the coupon, a "find store" button 720 for locating a store at which the coupon can be used, a "use coupon" button 730, detailed images 740, a detailed description 750, an "view advertisement" button 760, an "apply" button 770 for participating in an event, barcode information 780 for the coupon.

Figure 8:
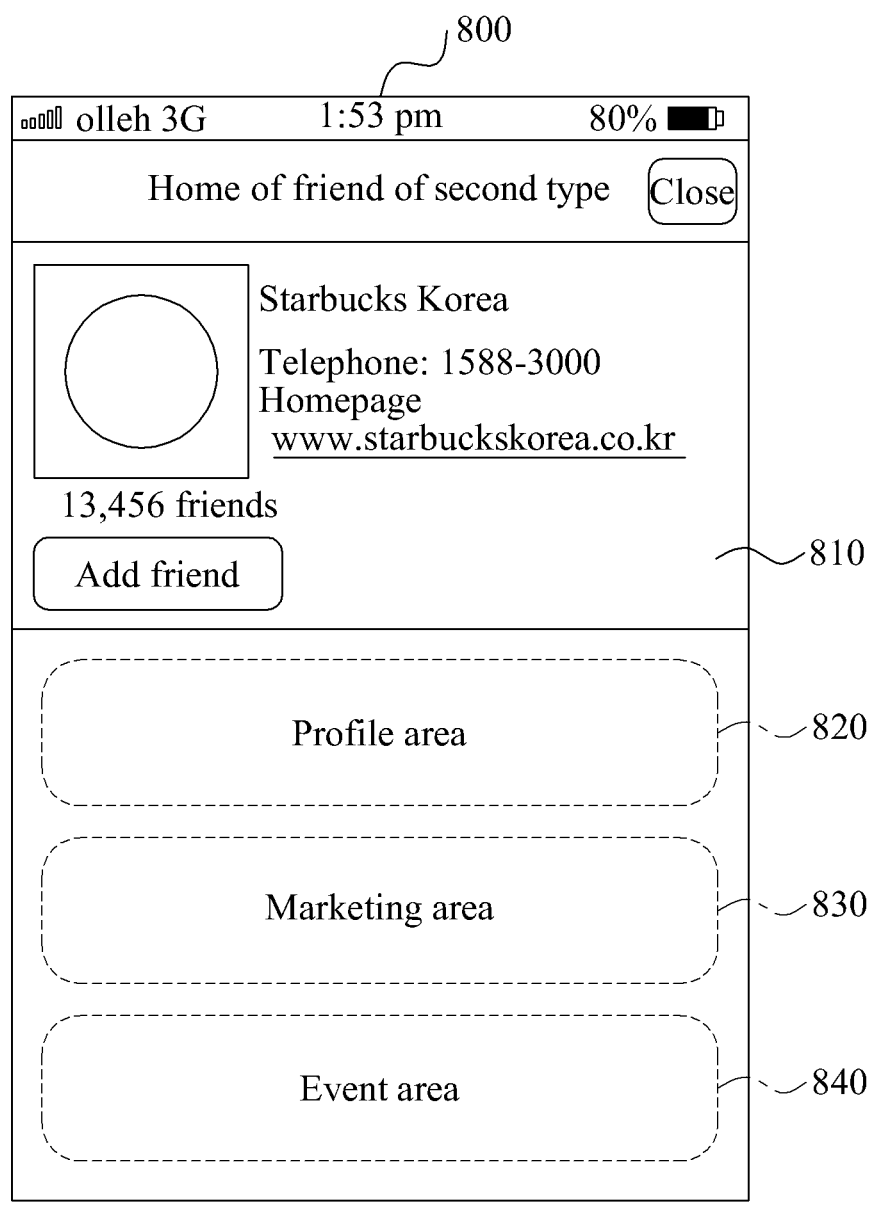

The mobile terminal 230 may further provide a home screen of the friend of the second type. The home screen may be implemented as a home screen 800 of FIG. 8. When the homepage link button 620 is executed in the pop-up window 610 of FIG. 6, the home screen 800 may be displayed. For this purpose, the mobile terminal may receive data for configuring the home screen 800 from the message server.

The home screen 800 may include at least one of an area 810 in which a brief description of the friend of the second type and an "add friend" function is provided, a profile area 820, a marketing area 830 for displaying an advertisement, and an event area 840 for inserting event information.

Also, the mobile terminal 230 may provide a "recommend friend" function for recommending the friend of the second type in the chat window with the first type of friend. The "recommend friend" function may be implemented as shown in FIG. 9.

Figure 9:
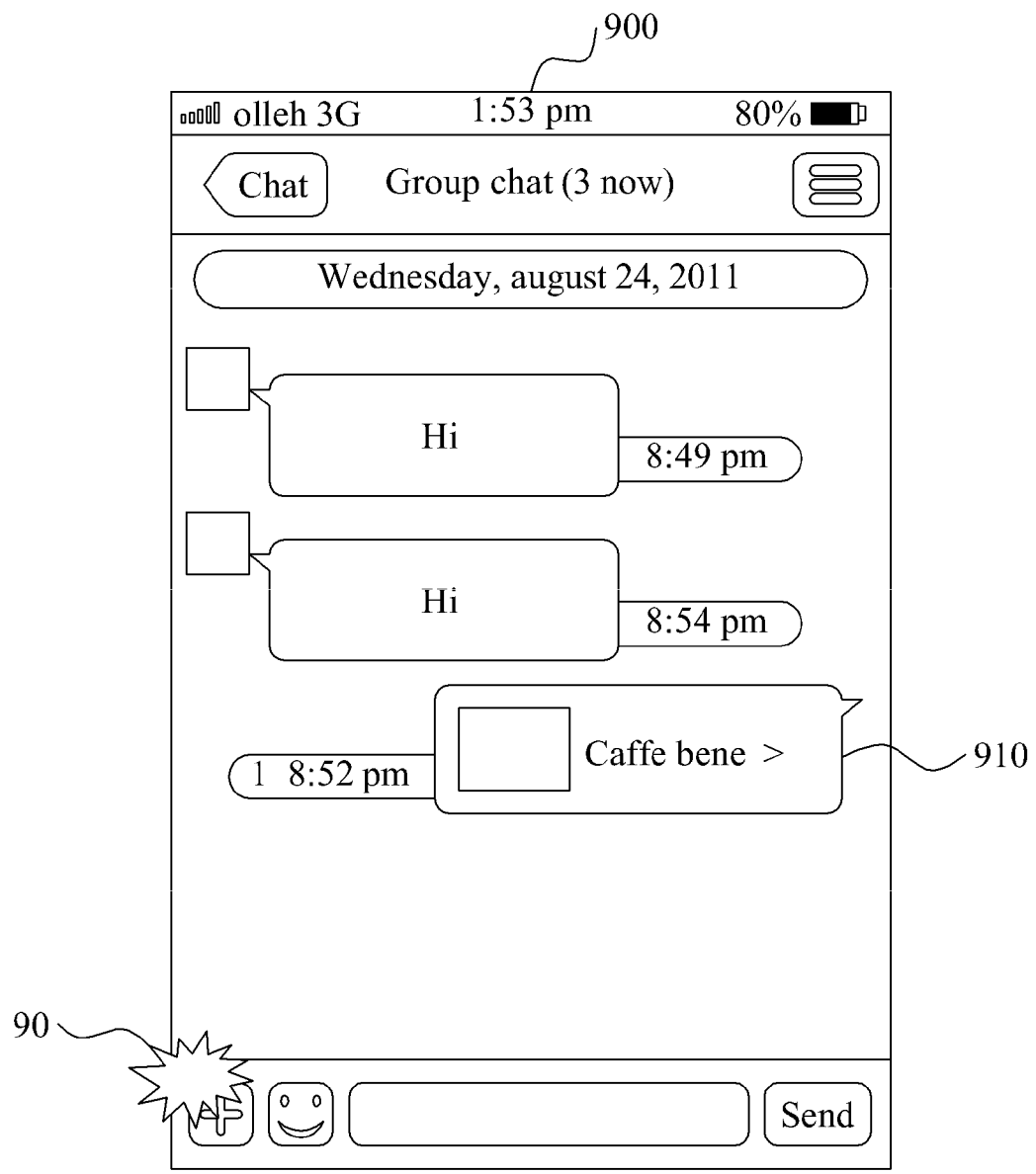

Referring to FIG. 9, a chat window 900 showing a group chat may provide a button 90 in a user input window. Through the button 90, the user may send a general message, and also may attach, to the message, various data, for example, an image message, a voice message, a gift, a telephone number, and the like, and may send the message with the data to users of the group chat. The mobile terminal may provide a function of attaching the data for recommending the friend of the second type to the users of the group chat.

When the "recommend friend" function is executed, the mobile terminal 230 may display, in the chat window 900, a message 910 to which data for recommending the friend of the second type is attached.

The mobile terminal 230 may set information associated with the chat window with the friend of the second type. The information may be set through a display 1000 of FIG. 10.

Figure 10:
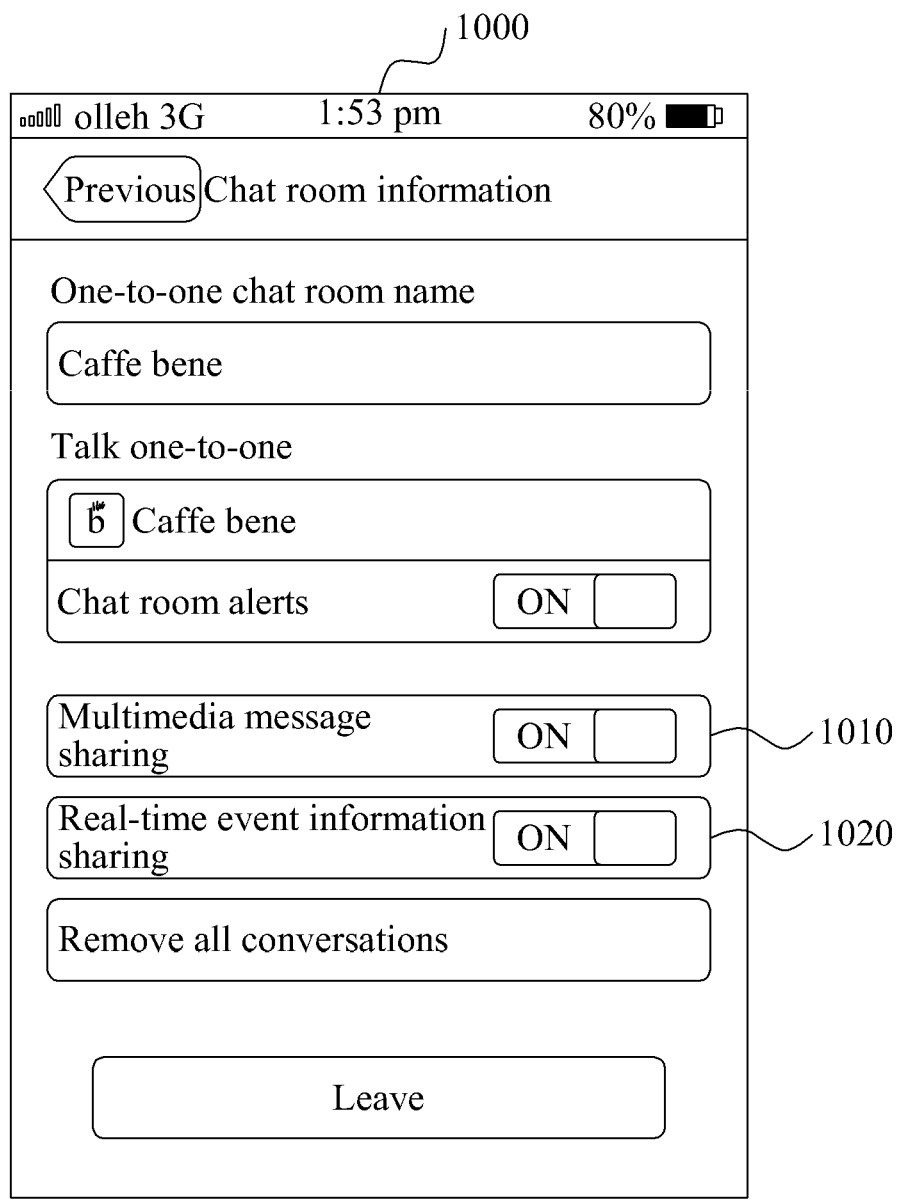

Referring to FIG. 10, the display 1000 may provide a function of setting the chat room between the user and the friend of the second type. The setting function may include at least one of a function 1010 of turning a multimedia message sharing option ON or OFF and a function 1020 of turning a real-time event information sharing option ON or OFF, as well as a basic function, for example, a function of setting a name of a one-to-one chat room, a function of turning a chat room alert option ON or OFF, and a function of removing all conversations.

Figure 11:
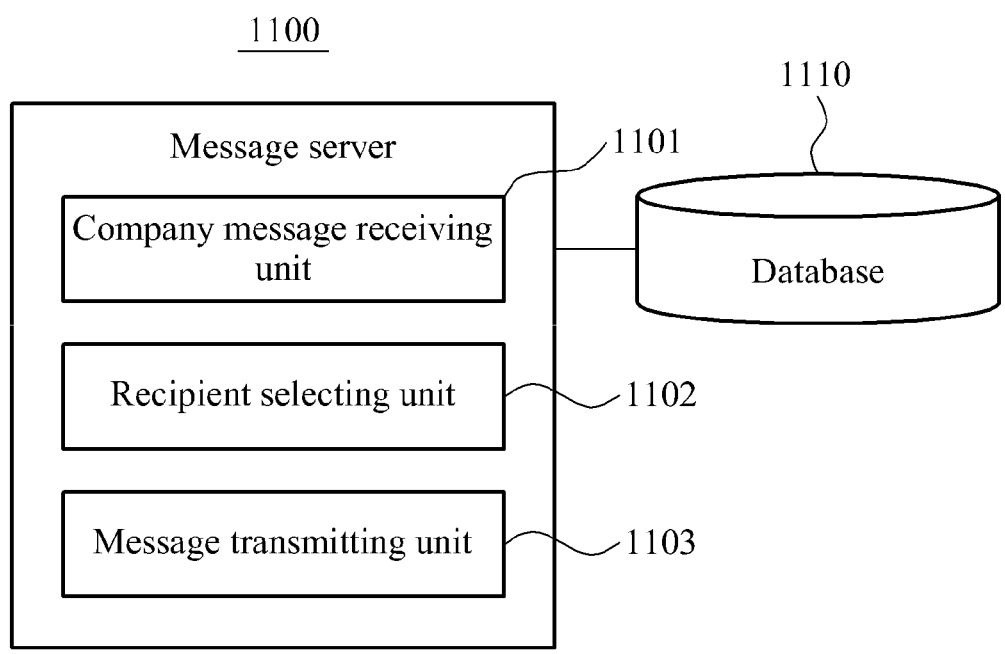
FIG. 11 is a diagram illustrating a structure of a message server for implementing a method of providing an instant messaging service according to an exemplary embodiment of the present invention.

FIG. 11 is a diagram illustrating a structure of a message server 1100 for implementing a method of providing an instant messaging service according to an exemplary embodiment of the present invention.

Referring to FIG. 11, the message server 1100 may interwork with a database 1110 to provide an instant messaging service between friends of the first type. Also, the message server 1100 may transmit a chat message sent from a friend of the second type, that is, the company 130 to a user as a registered friend among friends of the second type.

The database 1110 may store a list of a plurality of friends of at least one of the first type and the second type for each of a plurality of users.

The message server 1100 may transmit a chat message received from a friend of the first type or the second type to a recipient of the chat message based on the friend list stored in the database 1110.

The message server 1100 may include a company message receiving unit 1101, a recipient selecting unit 1102, and a message transmitting unit 1103.

The company message receiving unit 1101 may receive a chat message transmit request from a friend of the second type. The chat message may be written directly by the friend of the second type, or may be written automatically. The chat message may include at least one of a video, coupon information, event information, advertising information, and a voting interface.

The company message receiving unit 1101 may receive a chat message transmit request from a friend of the second type through interworking with an application programming interface (API) of a predetermined company. Alternatively, the message server 1100 may issue an account to a company in advance. The company message receiving unit 1101 may allow logging-in to the company account in response to data being received from the company, and when a log-in succeeds, may enable the company to make a request to transmit a chat message.

The recipient selecting unit 1102 may obtain information about users as registered friends among the friends of the second type from the database 1110, and may analyze at least one of location information, a region of interest, an access state, a number of accesses, a number of used coupons, a number of friend recommendations, and a number of read messages, among the obtained information. The recipient selecting unit 1102 may select a recipient of a chat message requested to transmit among the users as the registered friends of the friend of the second type based on the analysis result. The selected recipient may correspond to some registered friends limited by the friend of the second type or all the registered friends.

The message transmitting unit 1103 may transmit the chat message to the recipient selected by the recipient selecting unit 1102. The message transmitting unit 1103 may insert an identifier indicating the friend of the second type, for example, "at symbol" or @, into sender information of the chat message, and may transmit the chat message having the sender information with the identifier to the recipient.

When the message transmitting unit 1103 receives the chat message transmit request from a friend of the first type, the message transmitting unit 1103 may transmit the requested chat message to the recipient automatically. The message transmitting unit 1103 may transmit the chat message requested from the friend of the first type and the chat message requested from the friend of the second type, irrespective of a type of the friend. Alternatively, the chat message may be transmitted through different elements based on a type of the friend.

Also, when the message transmitting unit 1103 transmits the chat message requested to be transmitted from the friend of the second type, the message transmitting unit 1103 may charge a fee for the transmission of the chat message. For example, the message transmitting unit 1103 may match a predetermined amount to the friend of the second type each time the message transmitting unit 1103 transmits the chat message requested to transmit from the friend of the second type, and may calculate an accumulated fee. Alternatively, when a predetermined amount is pre-paid by the friend of the second type, the message transmitting unit 1103 may compute, in real time, a number of chat message transmissions or a period of time during which chat message are transmitted.

Figure 12:
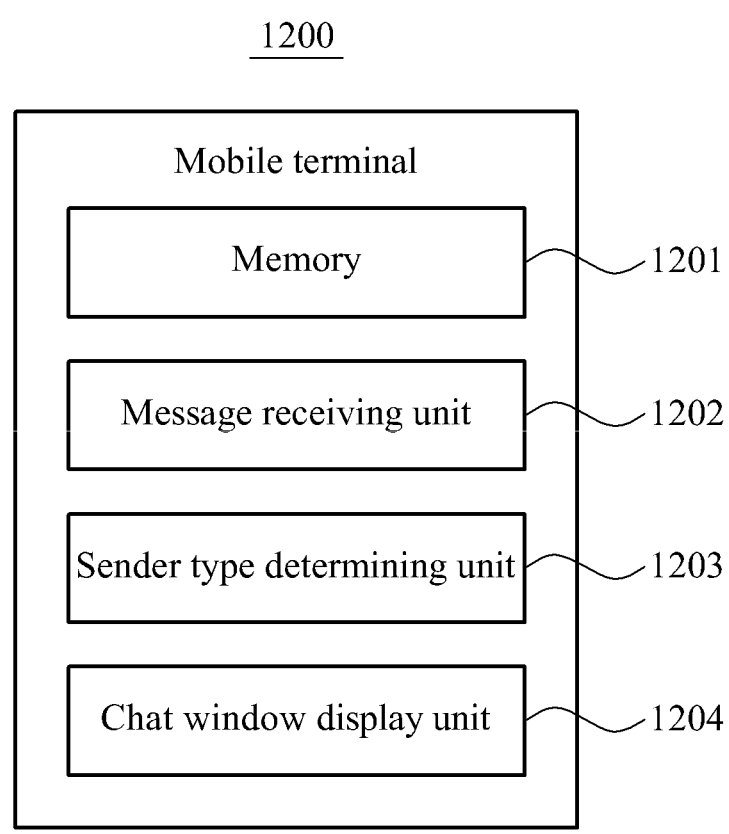
FIG. 12 is a diagram illustrating an example of a mobile terminal for implementing a method of providing an instant messaging service according to an exemplary embodiment of the present invention.

FIG. 12 is a diagram illustrating an example of a mobile terminal 1200 for implementing a method of providing an instant messaging service according to an exemplary embodiment of the present invention. A description of the mobile terminal 1200 receiving a chat message sent from a friend of the first type or the second type is provided. This may correspond to a portion of functions of a chat application installed in the mobile terminal 1200.

Referring to FIG. 12, the mobile terminal 1200 may include a memory 1201, a message receiving unit 1202, a sender type determining unit 1203, and a chat window display unit 1204.

The memory 1201 may have a chat application installed in the memory 1201, and may store a list of a plurality of friends of at least one of the first type and the second type in relation to the chat application.

The message receiving unit 1202 may receive a chat message from the message server through the wireless communication network.

The sender type determining unit 1203 may determine whether a type of a sender of the chat message received by the message receiving unit 1202 is the first type or the second type. The sender type determining unit 1203 may determine whether the type of the sender is the first type or the second type based on sender information of the received chat message. The determination as to whether the type of the sender is the first type or the second type may be conducted by the sender type determining unit 1203 identifying a friend having the same identity information as the sender of the chat message from the memory 1201. When the pre-defined identifier, "at symbol" or @, is inserted, by the message server, into the sender information of the chat message requested to transmit from the friend of the second type, the determination may be conducted only by the sender type determining unit 1203 to determine whether the pre-defined identifier is included in the sender information.

The chat window display unit 1204 may determine whether to overlay the user input window on the chat window showing the chat message based on the type of the sender of the chat message, and may overlay the user input window on the chat window selectively, based on the determined result.

When the type of the sender of the chat message is the second type, the chat window display unit 1204 may determine not to overlay the user input window on the chat window, and may display the chat window showing the chat message between the user and the sender of the friend of the second type. Also, the chat display unit 1204 may further display additional information associated with the sender as the friend of the second type in the chat window.

Figure 13:
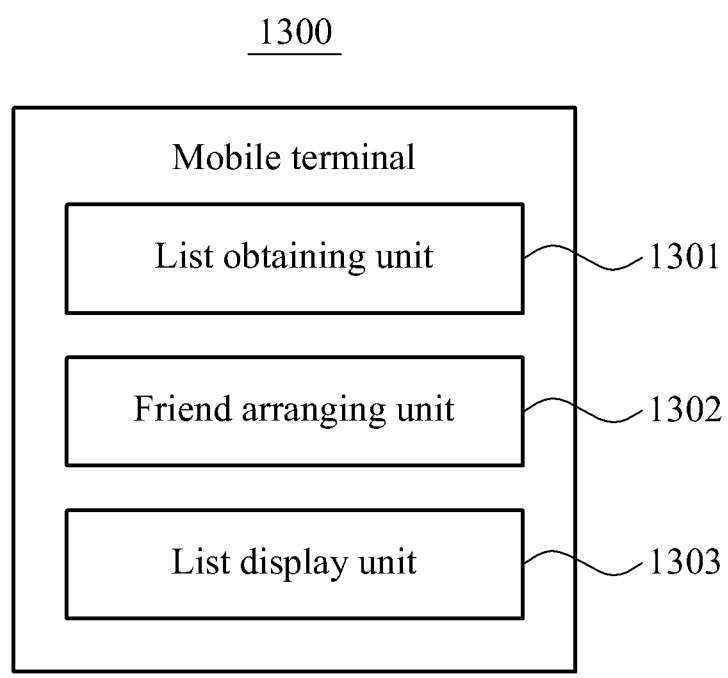
FIG. 13 is a diagram illustrating another example of a mobile terminal for implementing a method of providing an instant messaging service according to an exemplary embodiment of the present invention.

FIG. 13 is a diagram illustrating another example of a mobile terminal 1300 for implementing a method of providing an instant messaging service according to an exemplary embodiment of the present invention. A description of the mobile terminal 1300 managing recommended friends of the first type and the second type through interworking with the message server is provided. This may correspond to a portion of functions of a chat application installed in the mobile terminal 1300.

The message server may transmit a list of friends of the first type or the second type to the mobile terminal 1300. Also, the message server may generate ranking information of the friends for each type based on at least one of a region of interest, a location, popularity, a number of friends, a number of recommendations, and bidding information, associated with a predetermined user.

Referring to FIG. 13, the mobile terminal 1300 may include a list obtaining unit 1301, a friend arranging unit 1302, and a list display unit 1303.

The list obtaining unit 1301 may receive a list of a plurality of friends of at least one of the first type and the second type.

The friend arranging unit 1302 may receive, from the message server, the ranking information of the friends of the second type generated based on at least one of a region of interest, a location, popularity, a number of friends, a number of recommendations, and bidding information, associated with the user. The friend arranging unit 1302 may receive the ranking information of the friends of the second type from the message server, and the friend arranging unit 1302 may receive, from the message server, information associated with the user, for example, at least one of a region of interest, a location, popularity, a number of friends, a number of recommendations, and bidding information, and may generate ranking information of the friends of the second type directly based on the received information.

The list display unit 1303 may arrange the friends of the second type in a friend recommendation window based on the ranking information of the friends of the second type, and may display the list based on the arrangement.

The mobile terminal 1300 may arrange the friends of the second type in the list preferentially, even after registering the friends of the second type.

In this case, the mobile terminal 1300 may obtain a list of registered friends of a predetermined user from the message server or the memory, and obtain ranking information of friends of the second type among the registered friends in the list. The mobile terminal 1300 may arrange the friends of the second type on the display showing the list based on the ranking information of the friends of the second type, and may display the list based on the arrangement.

FIGS. 14 through 20 are diagrams illustrating examples of windows of the mobile terminal 1300 of FIG. 13.

Figure 14:
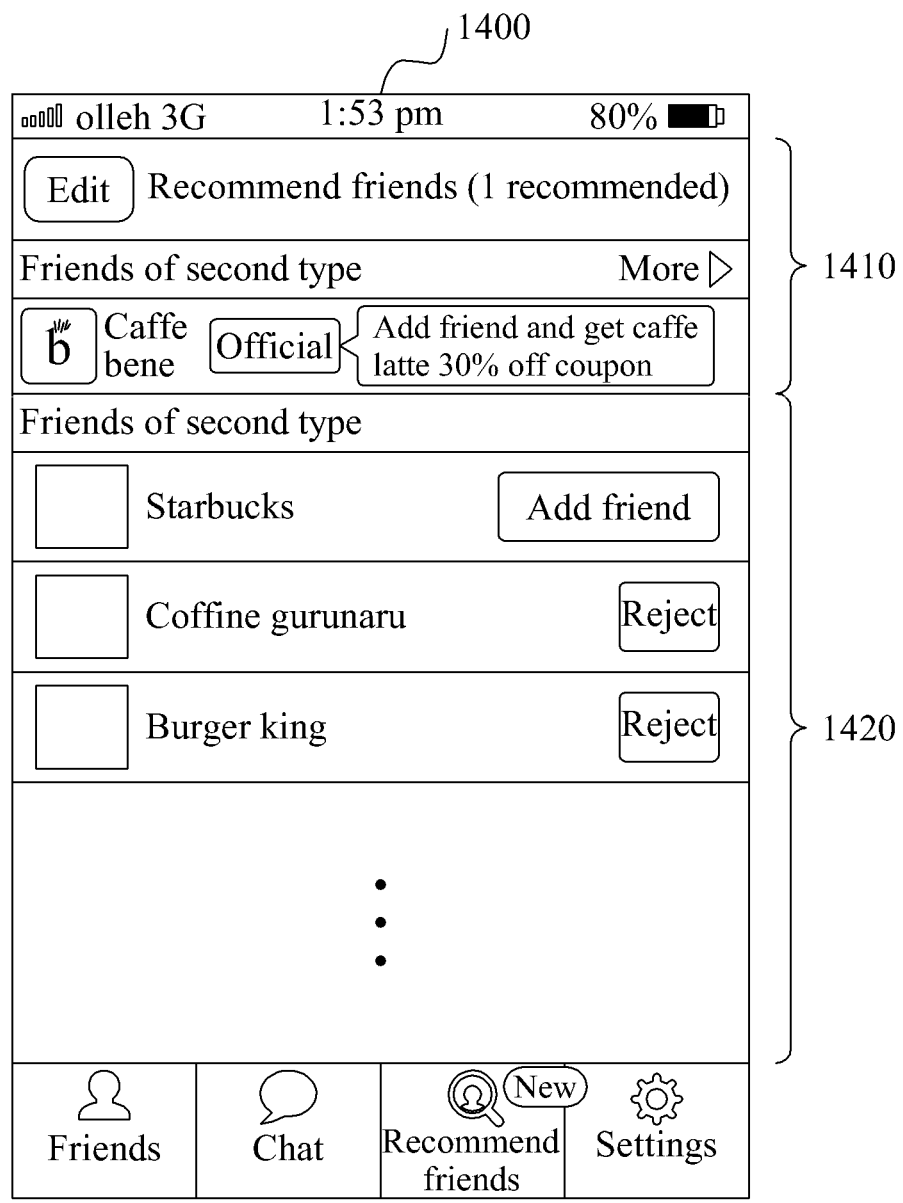
FIGS. 14 through 20 are diagrams illustrating examples of windows of the mobile terminal of FIG. 13.
Figure 15:
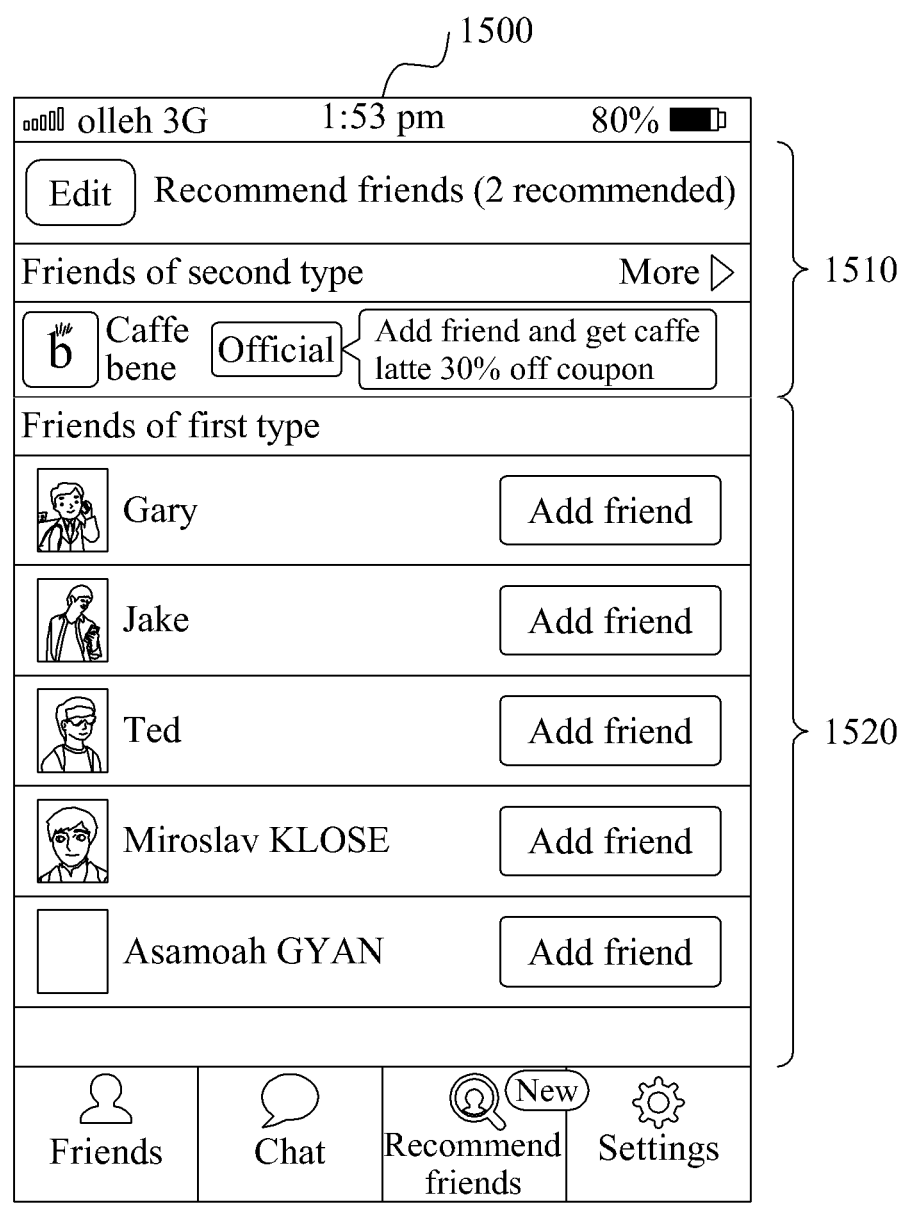

As shown in FIGS. 14 and 15, the mobile terminal may provide a friend recommendation window. In particular, as shown in FIG. 15, the mobile terminal may provide a friend recommendation window such that a friend of the first type and a friend of the second type are distinguished from one another. In a directory including the friend of the first type and the friend of the second type, the friend of the first type and the friend of the second type may be distinguished from one another. The friend of the first type and the friend of the second type may be placed in different areas, or with different graphic effects.

In this case, the mobile terminal may receive a list of a plurality of recommended friends of at least one of a first type and a second type from the message server, and may obtain ranking information of the friends of the second type among the recommended friends in the list. The mobile terminal may arrange the friends of the second type in the list preferentially, based on the obtained ranking information.

Referring to FIG. 14, a display 1400 may receive the recommended friends of the second type from the message server. The mobile terminal may display the list of the friends of the second type in an area 1420, and may rank a predetermined friend among the friends of the second type or may display the predetermined friend at the top 1410 of the area 1420.

Referring to FIG. 15, a display 1500 may receive the recommended friends of the first type and the second type from the message server. The mobile terminal may display the friends of the second type in an upper area 1510 and may display the friends of the first type in a lower area 1520, based on the list of recommended friends received from the message server. The mobile terminal may determine a type of the friend included in the list and may determine where to display the friend.

Further, the user may register a friend of the second type desired by the user as a friend through keyword input. In this case, the message server may provide a search function as shown in FIG. 16.

Figure 16:
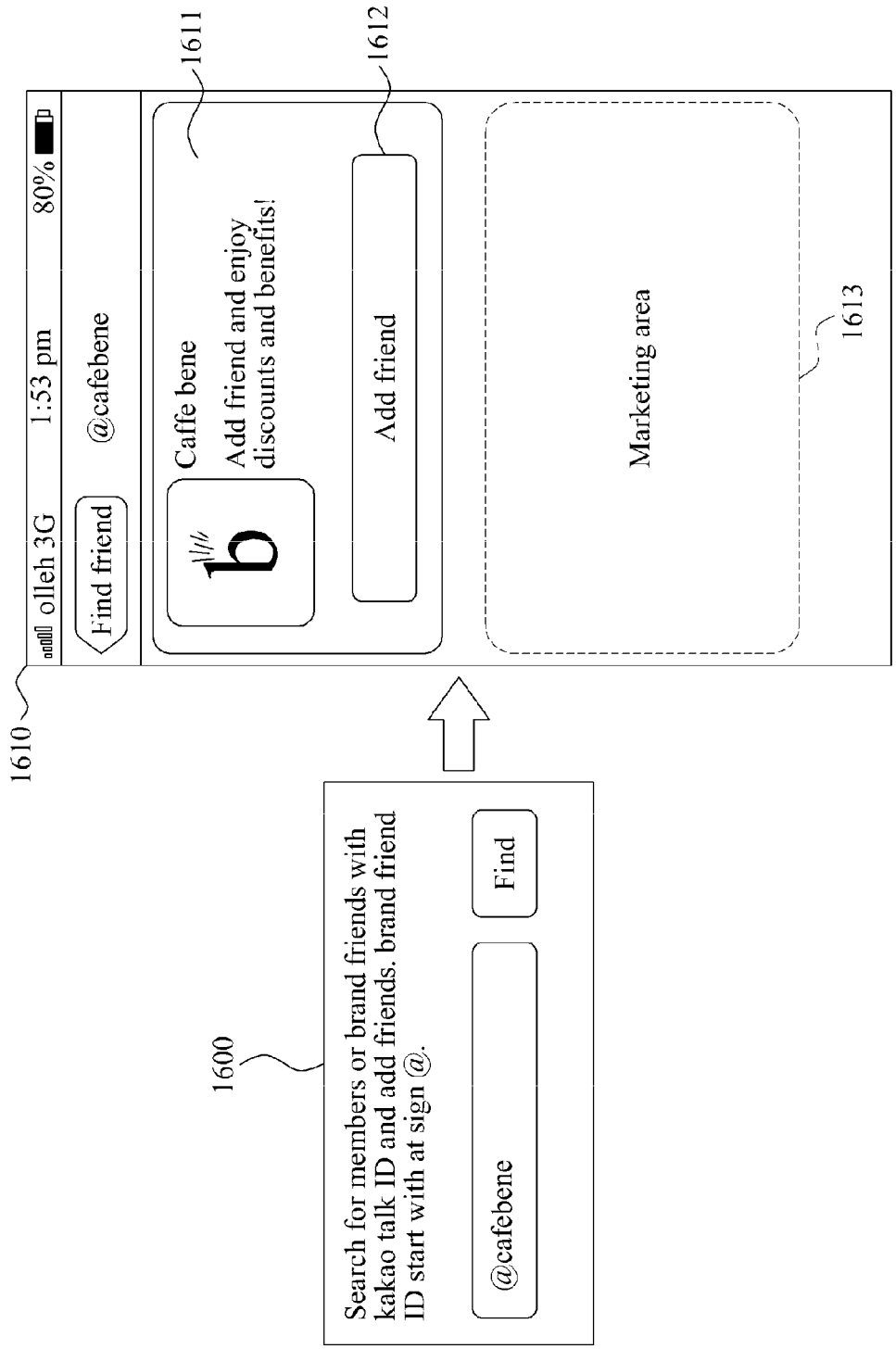

Referring to FIG. 16, the mobile terminal may transmit a keyword for locating a friend of the second type to the message server, and the mobile terminal may receive information associated with the friend of the second type received from the message server as a result of keyword search and may display the received information. On the keyword search, the message server may provide a predetermined identifier, "at symbol" or @, for quick search. The identifier may be used to identify the friend of the second type, and the identifier may be included in identity information of the friend of the second type directly or may provided as another element related to identity information.

The mobile terminal may provide the information associated with the friend of the second type received from the message server on a display 1610 as a result of keyword search. The display 1610 may include at least one of an area 1611 for introducing the friend of the second type, an "add friend" button 1612 for requesting addition of the friend of the second type, and a marketing area 1613 for marketing of the friend of the second type.

The mobile terminal may request "add friend" for the friend of the second type selected by the user to the message server through the displays of FIGS. 14 and 15.

Figure 17:
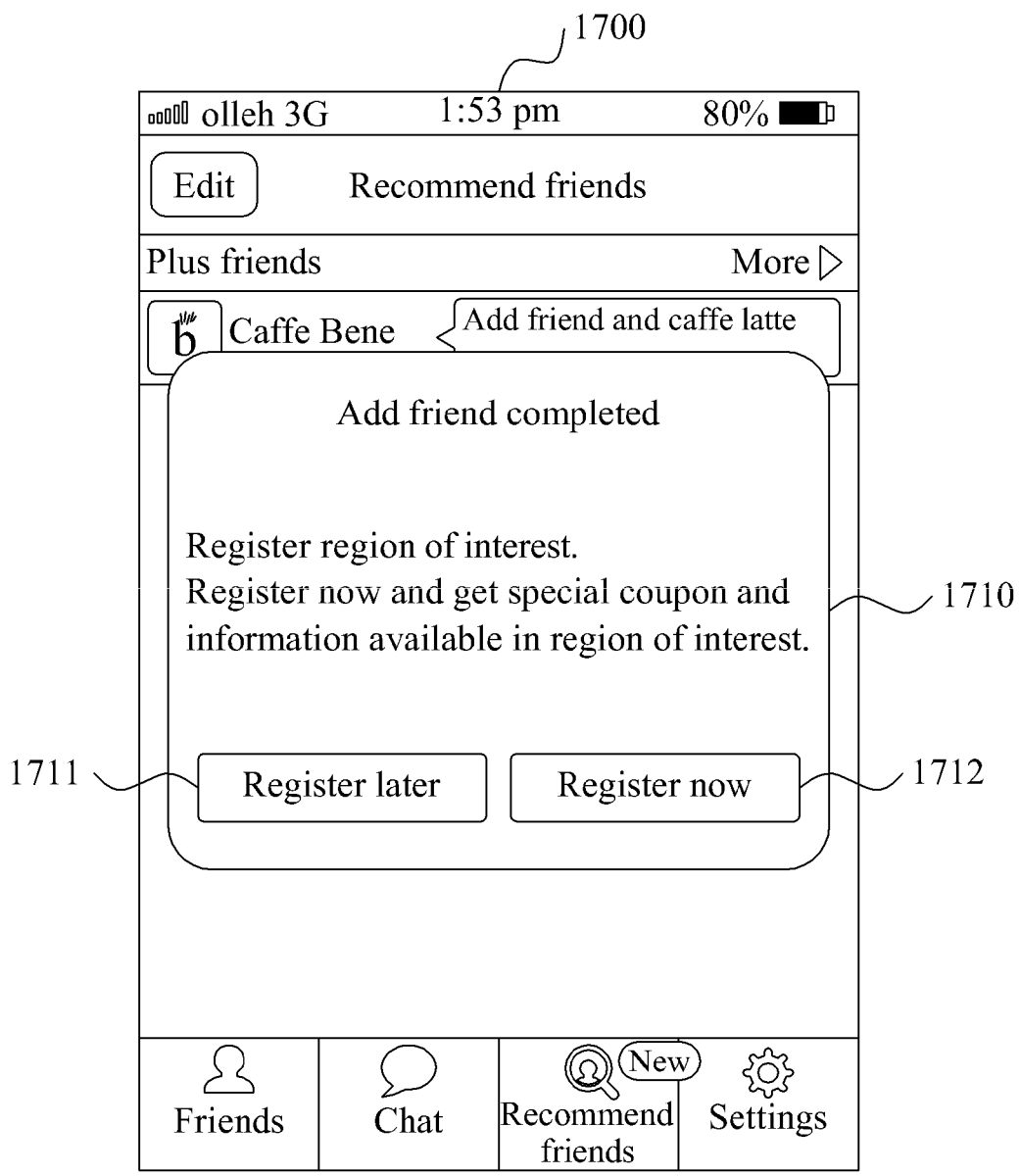
Figure 18:
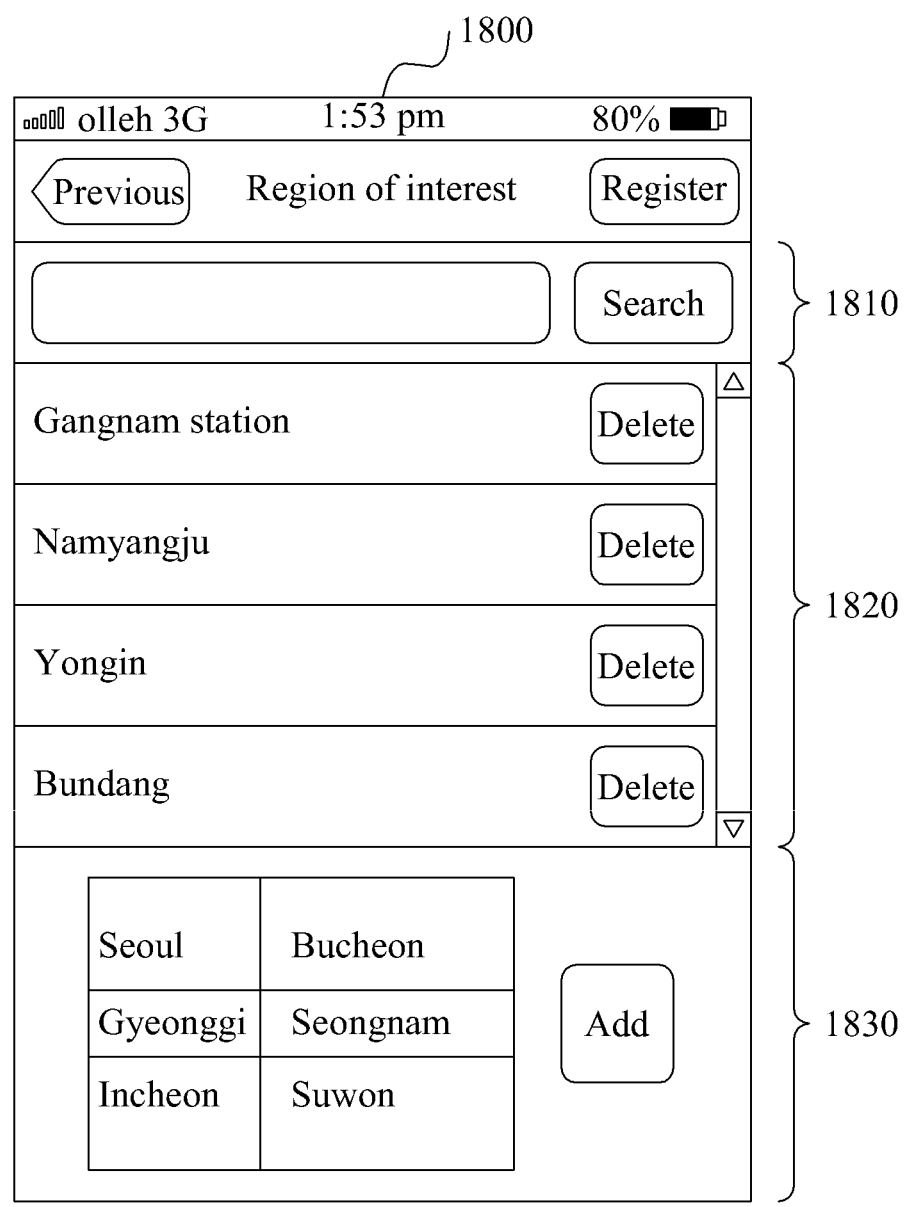

When "add friend" is completed, the mobile terminal may provide a pop-up window 1710 on a display 1700 of FIG. 17 to provide notification of "add friend" completion.

Referring to FIG. 17, the pop-up window 1710 may provide a function of receiving an input of additional information associated with the user as well as providing notification of "add friend" completion. For example, the additional information may include a region of interest. The additional information may be registered in the message server, and may be referred to when the friend of the second type transmits the chat message to the user. The mobile terminal may provide a display 1800 for registering a region of interest for the user in the message server. The display 1800 may include a function 1810 of searching for a desired region using a keyword or a function 1830 of selecting a desired region among a region list.

The mobile terminal may further provide a display for registering a friend.

Figure 19:
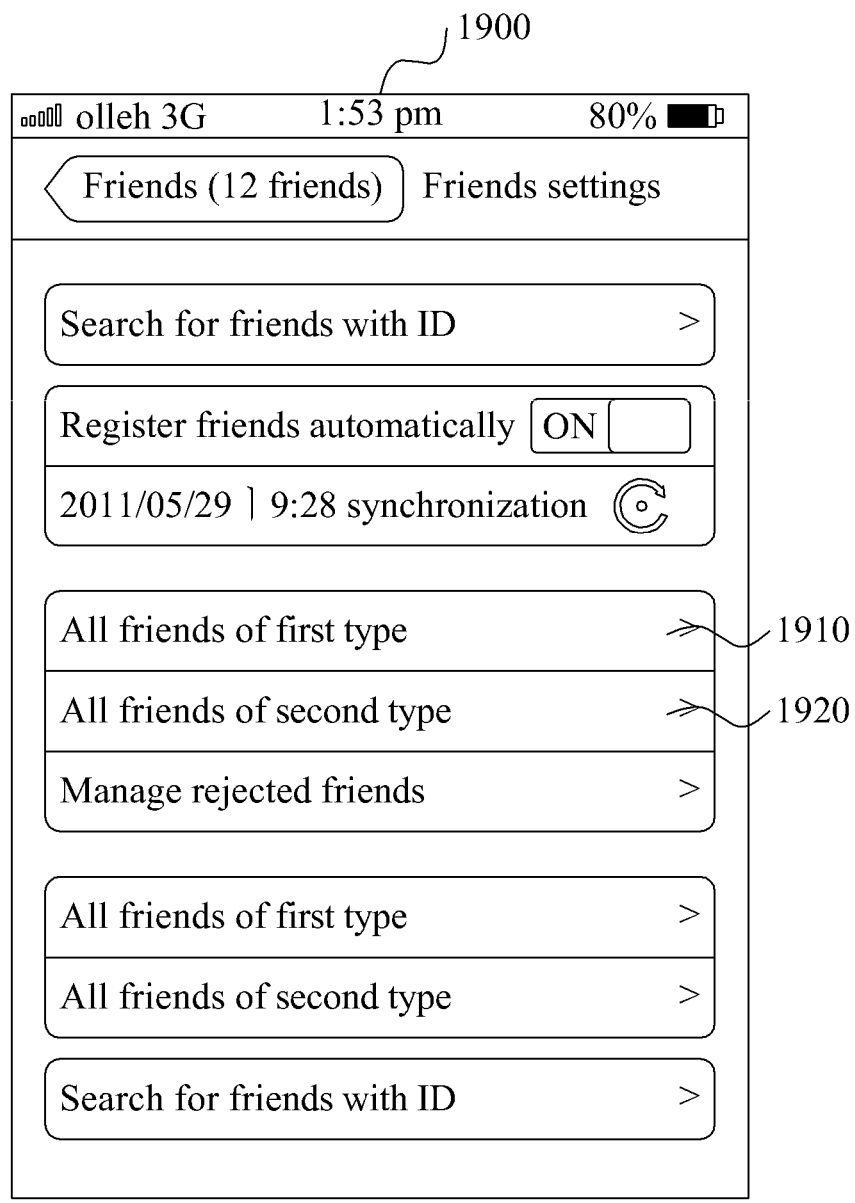

Referring to FIG. 19, the mobile terminal may implement a display 1900 for setting the friend management. The display 1900 may provide a function 1910 of showing a full list of friends of the first type and a function 1920 of showing a full list of friends of the second type, among friends of the user.

Figure 20:
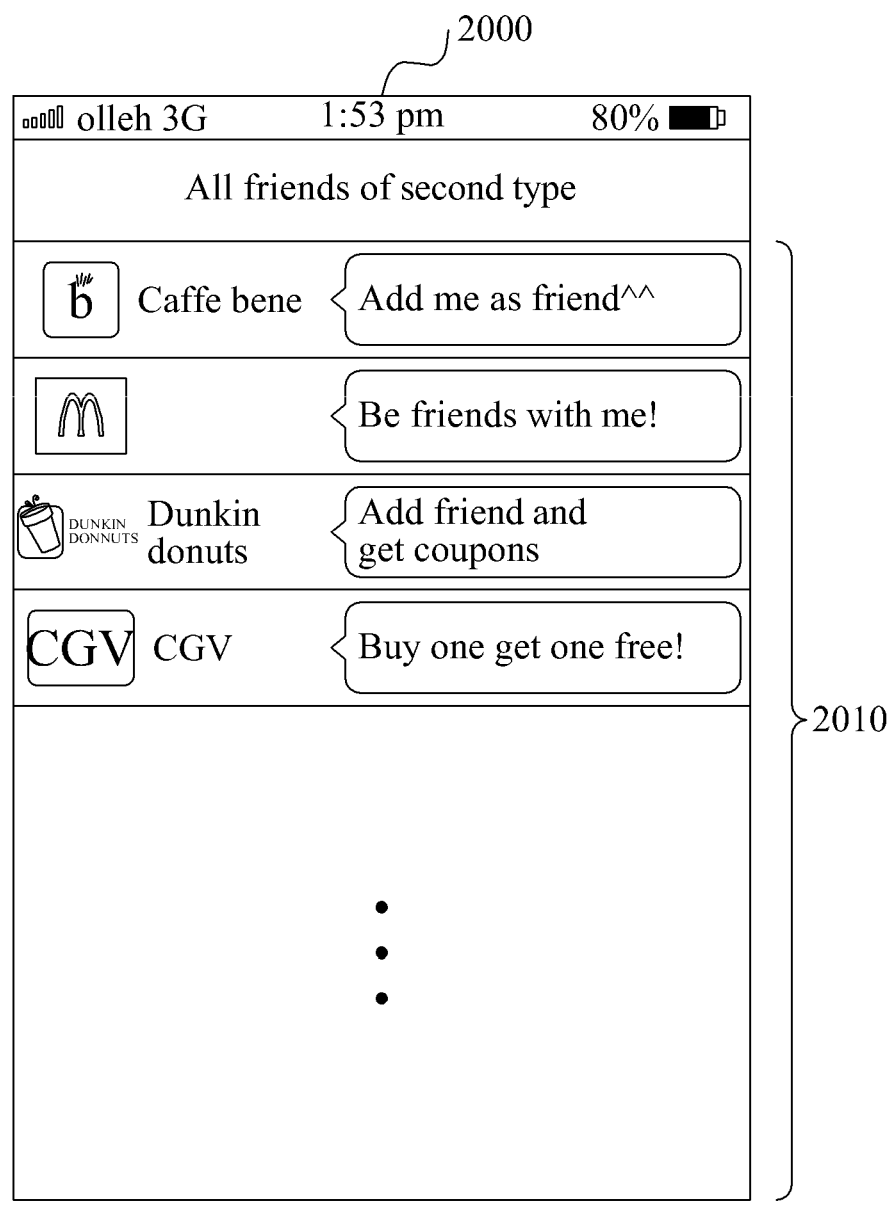

When the function 1920 of showing a full list of friends of the second type is executed, the mobile terminal may show the full list of friends of the second type as shown in a display 2000 of FIG. 20. On the display 2000, the mobile terminal may arrange the friends of the second type by name, by date registered, or by ranking information described in the foregoing.

Figure 21:
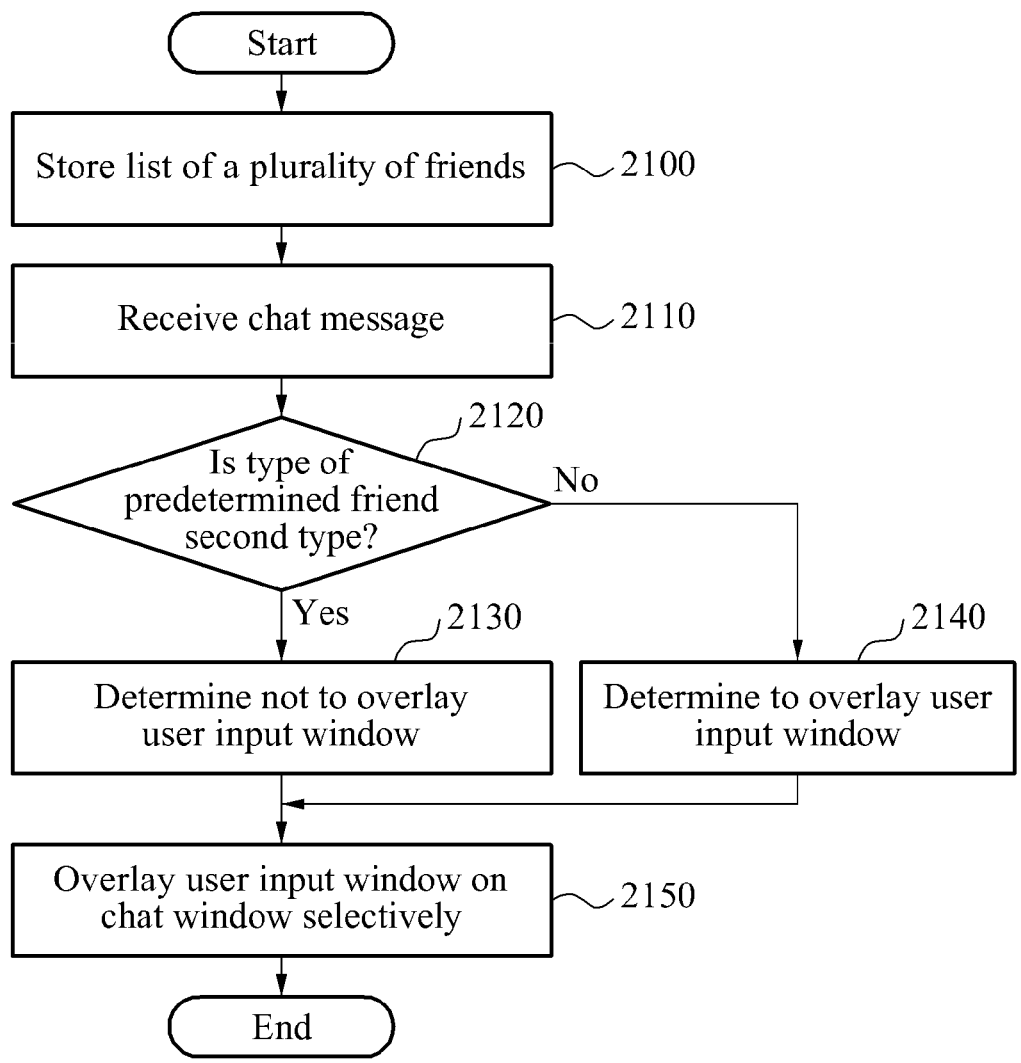
FIG. 21 is a flowchart illustrating a mobile terminal receiving a chat message in a method of providing an instant messaging service according to an exemplary embodiment of the present invention.

FIG. 21 is a flowchart illustrating a mobile terminal receiving a chat message in a method of providing an instant messaging service according to an exemplary embodiment of the present invention. The method may be performed by a chat program of the mobile terminal.

Referring to FIG. 21, in operation 2100, the mobile terminal may store, in a memory, a list of a plurality of friends of at least one of a first type and a second type.

In operation 2110, the mobile terminal may receive a chat message from a message server through a wireless communication network.

In operation 2120, the mobile terminal may determine whether a type of a sender of the received chat message is the second type.

In operation 2130, when the type of the sender is the second type, the mobile terminal may determine not to overlay a user input window on a chat window showing the chat message.

In operation 2140, when the type of the sender is not the second type, the mobile terminal may determine to overlay the user input window on the chat window showing the chat message.

In operation 2150, the mobile terminal may display the user input window on the chat window selectively, based on the result determined in operation 2130 or 2140.

The determining of whether the type of the sender is the second type in operation 2120 may be performed based on an identifier included in information associated with the sender of the chat message. For example, the determining of whether the type of the sender is the second type may include determining whether a predetermined identifier, "at symbol" or @, is included in information associated with the sender of the chat message.

The mobile terminal may display, in the chat window or another window, additional information associated with the sender, for example, at least one of a link to a homepage, a picture, an introductory text, a video, ranking information, and a number of friends. Also, the mobile terminal may recommend the friend of the second to another user.

Figure 22:
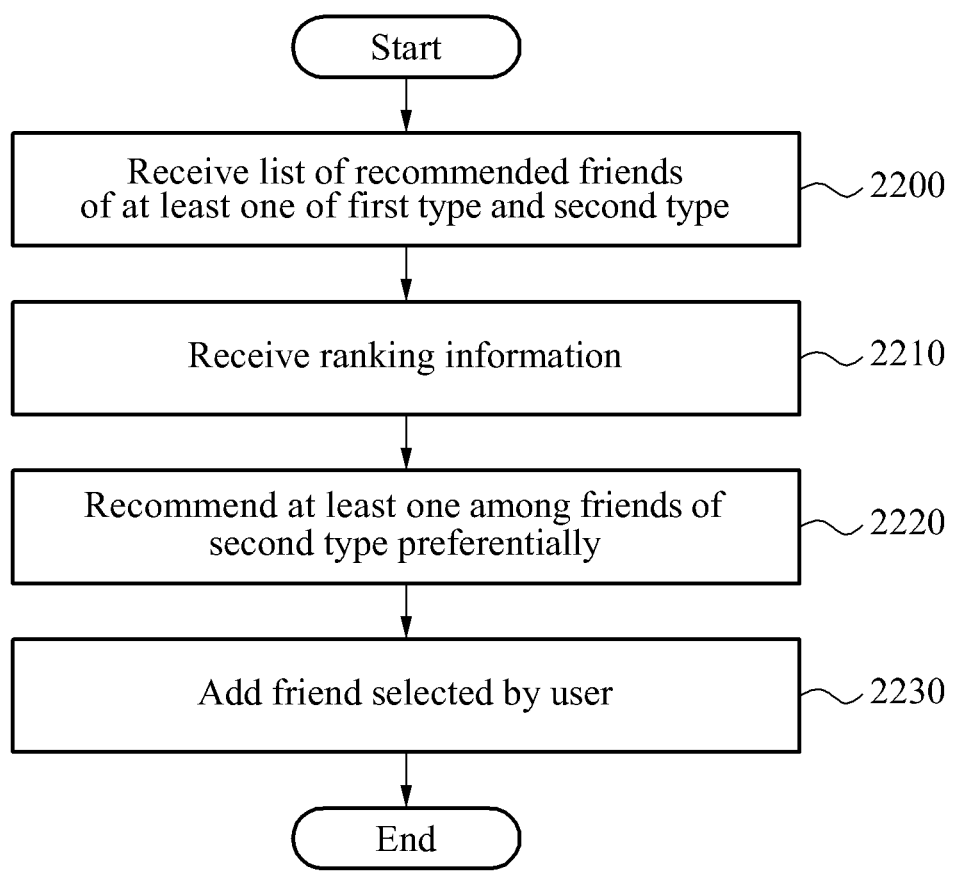
FIG. 22 is a flowchart illustrating a mobile terminal receiving recommended friends of a second type from a message server in a method of providing an instant messaging service according to an exemplary embodiment of the present invention.

FIG. 22 is a flowchart illustrating a mobile terminal receiving recommended friends of a second type from a message server in a method of providing an instant messaging service according to an exemplary embodiment of the present invention.

Referring to FIG. 22, in operation 2200, the mobile terminal may receive, from a message server, a list of a plurality of recommended friends of at least one of a first type and a second type.

In operation 2210, the mobile terminal may receive ranking information of the friends of the second type generated based on at least one of a region of interest, a location, popularity, a number of friends, a number of recommendations, and bidding information, associated with a predetermined user.

In operation 2220, the mobile terminal may recommend the friends of the second type on a friend recommendation window preferentially, based on the received ranking information. The mobile terminal may arrange the friends of the second type at the top of the display based on the ranking information, and may provide the friend recommendation window including the arranged friends of the second type. The arrangement may be implemented by placing all the friends of the second type at the top of the display or by arranging the friends of the second type based on the ranking information.

In operation 2230, the mobile terminal may request the message server to add a friend selected by the user in the friend recommendation window.

After the friend is added, the mobile terminal may still list the friends of the second type in a list of registered friends of the user preferentially. The mobile terminal may obtain, from the memory or the message server, the list of registered friends of the user, and may obtain ranking information of the friends of the second type among the registered friends. The mobile terminal may rank the friends of the second type on the display showing the list based on the ranking information of the friends of the second type, or may display the friends of the second type separately. Accordingly, in the list of registered friends of the user, the friends of the second type may be listed separately or displayed preferentially, to enable the user to recommend the friends of the second type easily.

Figure 23:
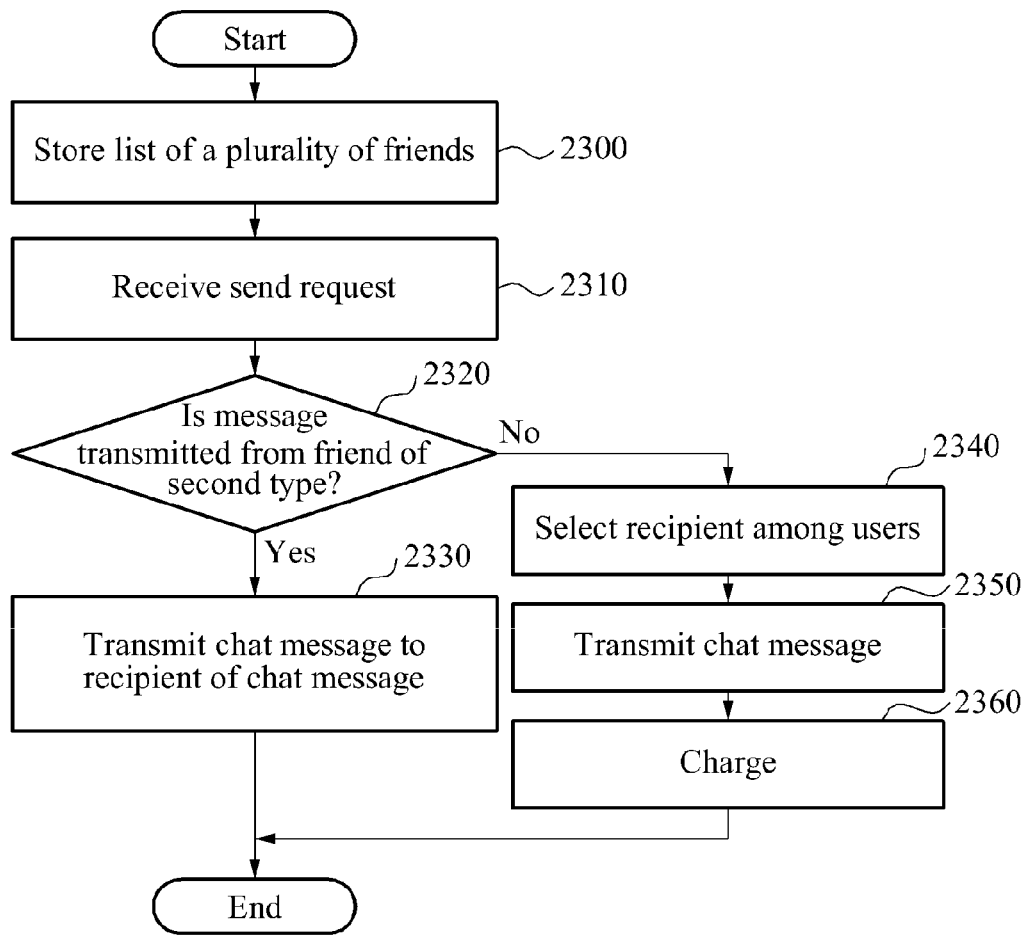
FIG. 23 is a flowchart illustrating a message server transmitting a chat message sent from a friend of a second type in a method of providing an instant messaging service according to an exemplary embodiment of the present invention.

FIG. 23 is a flowchart illustrating a message server transmitting a chat message sent from a friend of a second type in a method of providing an instant messaging service according to still another exemplary embodiment of the present invention.

Referring to FIG. 23, in operation 2300, the message server may store a list of a plurality of friends of at least one of a first type and a second type for each of a plurality of users.

In operation 2310, the message server may receive a request for transmission of a chat message from a friend of the second type.

The chat message requested to transmit from the friend of the second type may include at least one of a video, coupon information, event information, advertising information, and a voting interface.

In operation 2320, the message server may determine whether the request is transmitted from the friend of the second type.

In operation 2330, when the request is not transmitted from the friend of the second type, the message server may transmit the chat message to a recipient of the chat message.

In operation 2340, when the request is transmitted from the friend of the second type, the message server may select a recipient of the chat message among users as registered friends of the friend of the second type based on at least one of location information, an area of interest, an access state, a number of accesses, a number of used coupons, a number of recommended friends, and a number of read messages, associated with the users.

In operation 2350, the message server may transmit the chat message to the recipient selected in operation 2340.

In operation 2360, the message server may charge a fee for the transmission of the chat message.

Although the exemplary embodiment of FIG. 23 shows that the message server processes a chat message requested to be transmitted from the friend of the first type and a chat message requested to be transmitted from the friend of the second type at the same time, the present invention may be not limited thereto. For example, the message server may be implemented independently based on a type of the friend requesting transmission of the chat message. In this case, the message server may be implemented as shown in FIG. 11, and operations 2320 and 2330 may be omitted.

The methods according to the exemplary embodiments of the present invention the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A system for operating a terminal for an instant messaging service, the system comprising:
   a database, the database storing a list of friends including a friend of a first type or a friend of a second type for a user, wherein the friend of the first type is a friend of a same type as the user, and the friend of the second type is an insubstantial virtual friend;
   a message server, the message server registering a friend of the user as the friend of the first type or the friend of the second type and transmitting a chat message received from the friend of the first type or from the friend of the second type to a recipient of the chat message based on the list of friends stored in the database, wherein the message server generates ranking information of the friends for the friend of the first type or for the friend of the second type based on a region of interest, a location, a popularity, a number of friends, a number of recommendations, and bidding information, associated with a predetermined user;
   a message receiving processor, the message receiving processor receiving a chat message transmit request and receiving the chat message from the message server through a communication network, wherein the chat message includes a video, a coupon, event information, advertising information, and a voting interface;
   a recipient selecting processor, the recipient selecting processor obtaining information of users as registered friends among the friends of the second type from the database, and analyzing location information, a region of interest, an access state, a number of accesses, a number of used coupons, a number of friend recommendations, and a number of read messages, wherein the recipient selecting processor selects a recipient of the chat message among the users as the registered friends of the friend of the second type based on the analysis;
   a message transmitting processor, the message transmitting processor transmitting the chat message to the recipient selected by the recipient selecting processor, wherein the message transmitting processor inserts an identifier indicating the friend of the first type or the second type into the chat message;
   a sender type determining processor, the sender type determining processor determining whether a type of a sender of the received chat message is the friend of the first type or the friend of the second type among the registered friends of the user;
   a chat window display processor, the chat window display processor determining whether to overlay a user input window on a chat window showing the chat message based on the type of the sender of the chat message, and overlaying the user input window on the chat window selectively based on the determined result;
   a friend arranging processor, the friend arranging processor receiving, from the message server, the ranking information of the friends for the friend of the first type and the friend of the second type and information associated with the user including a region of interest, a location, a popularity, a number of friends, a number of recommendations, and bidding information, and re-generating the ranking information of the friends for the friend of the first type and the friend of the second type based on the received information associated with the user; and
   a list display processor, the list display processor arranging the friends in a friend recommendation window based on the ranking information and displaying the list based on the arrangement, wherein the list display processor displays the coupon received from the friend of the second type for the user to select.

2. The system of claim 1, wherein the message server recommends the sender of the received chat message to another user based on a user selection input when the type of the sender is the second type.

3. The system of claim 1, wherein the message transmitting processor charges a fee for the transmission of the chat message.

4. The system of claim 1, wherein the type of the sender of the received chat message is determined based on the identifier included in information associated with the sender of the received chat message.

5. The system of claim 1, wherein the chat window display processor displays a chat window not overlaid with the user input window for writing an answer message in response to the received chat message when the type of the sender of the received chat message is the second type.

6. The system of claim 1, wherein the chat window display processor displays a chat window overlaid with the user input window for writing an answer message in response to the received chat message when the type of the sender of the received chat message is the second type and the friend of the second type is not able to communicate with the answer message received from the terminal.

7. A method for operating a terminal for an instant messaging service, the method comprising:
   storing a list of friends including a friend of a first type or a friend of a second type for a user in a database, wherein the friend of the first type is a friend of a same type as the user, and the friend of the second type is an insubstantial virtual friend;
   registering a friend of the user as the friend of the first type or the friend of the second type and transmitting a chat message received from the friend of the first type or from the friend of the second type to a recipient of the chat message based on the list of friends stored in the database, wherein ranking information of the friends for the friend of the first type or for the friend of the second type is generated based on a region of interest, a location, a popularity, a number of friends, a number of recommendations, and bidding information, associated with a predetermined user;
   receiving a chat message transmit request and receiving the chat message through a communication network, wherein the chat message includes a video, a coupon, event information, advertising information, and a voting interface;
   obtaining information of users as registered friends among the friends of the second type from the database, and analyzing location information, a region of interest, an access state, a number of accesses, a number of used coupons, a number of friend recommendations, and a number of read messages, wherein a recipient of the chat message is selected among the users as the registered friends of the friend of the second type based on the analysis;

transmitting the chat message to the recipient, wherein an identifier indicating the friend of the first type or the second type is inserted into the chat message;

determining whether a type of a sender of the received chat message is the friend of the first type or the friend of the second type among the registered friends of the user;

determining whether to overlay a user input window on a chat window showing the chat message based on the type of the sender of the chat message, and overlaying the user input window on the chat window selectively based on the determined result;

receiving the ranking information of the friends for the friend of the first type and the friend of the second type and information associated with the user including a region of interest, a location, a popularity, a number of friends, a number of recommendations, and bidding information, and re-generating the ranking information of the friends for the friend of the first type and the friend of the second type based on the received information associated with the user; and arranging the friends in a friend recommendation window based on the ranking information and displaying the list based on the arrangement, wherein the coupon received from the friend of the second type is displayed for the user to select.

8. The method of claim 7, further comprising:

recommending the sender of the received chat message to another user based on a user selection input when the type of the sender is the second type.

9. The method of claim 7, further comprising:

charging a fee for the transmission of the chat message in response to transmitting the chat message.

10. The method of claim 7, wherein determining whether the type of the sender of the received chat message is the friend of the first type or the friend of the second type comprises determining whether the type of the sender of the received chat message is the first type or the second type based on the identifier included in information associated with the sender of the received chat message.

11. The method of claim 7, wherein a chat window is not overlaid with the user input window for writing an answer message in response to the received chat message when the type of the sender of the received chat message is the second type.

12. The method of claim 7, wherein a chat window is overlaid with the user input window for writing an answer message in response to the received chat message when the type of the sender of the received chat message is the second type and the friend of the second type is not able to communicate with the answer message received from the terminal.

13. A non-transitory computer readable recording medium storing computer readable instructions which, when executed by a computer system, perform a method for operating a terminal for an instant messaging service, the method comprising:

storing a list of friends including a friend of a first type or a friend of a second type for a user in a database, wherein the friend of the first type is a friend of a same type as the user, and the friend of the second type is an insubstantial virtual friend;

registering a friend of the user as the friend of the first type or the friend of the second type and transmitting a chat message received from the friend of the first type or from the friend of the second type to a recipient of the chat message based on the list of friends stored in the database, wherein ranking information of the friends for the friend of the first type or for the friend of the second type is generated based on a region of interest, a location, a popularity, a number of friends, a number of recommendations, and bidding information, associated with a predetermined user;

receiving a chat message transmit request and receiving the chat message through a communication network, wherein the chat message includes a video, a coupon, event information, advertising information, and a voting interface;

obtaining information of users as registered friends among the friends of the second type from the database, and analyzing location information, a region of interest, an access state, a number of accesses, a number of used coupons, a number of friend recommendations, and a number of read messages, wherein a recipient of the chat message is selected among the users as the registered friends of the friend of the second type based on the analysis;

transmitting the chat message to the recipient, wherein an identifier indicating the friend of the first type or the second type is inserted into the chat message;

determining whether a type of a sender of the received chat message is the friend of the first type or the friend of the second type among the registered friends of the user;

determining whether to overlay a user input window on a chat window showing the chat message based on the type of the sender of the chat message, and overlaying the user input window on the chat window selectively based on the determined result;

receiving the ranking information of the friends for the friend of the first type and the friend of the second type and information associated with the user including a region of interest, a location, a popularity, a number of friends, a number of recommendations, and bidding information, and re-generating the ranking information of the friends for the friend of the first type and the friend of the second type based on the received information associated with the user; and arranging the friends in a friend recommendation window based on the ranking information and displaying the list based on the arrangement, wherein the coupon received from the friend of the second type is displayed for the user to select.

14. The non-transitory computer readable recording medium of claim 13, wherein the method further comprises:

recommending the sender of the received chat message to another user based on a user selection input when the type of the sender is the second type.

15. The non-transitory computer readable recording medium of claim 13, wherein the method further comprises:

charging a fee for the transmission of the chat message in response to transmitting the chat message.

16. The non-transitory computer readable recording medium of claim 13, wherein determining whether the type of the sender of the received chat message is the friend of the first type or the friend of the second type comprises determining whether the type of the sender of the received chat message is the first type or the second type based on the identifier included in information associated with the sender of the received chat message.

17. The non-transitory computer readable recording medium of claim 13, wherein a chat window is not overlaid with the user input window for writing an answer message in response to the received chat message when the type of the sender of the received chat message is the second type.

18. The non-transitory computer readable recording medium of claim 13, wherein a chat window is overlaid with the user input window for writing an answer message in response to the received chat message when the type of the sender of the received chat message is the second type and the friend of the second type is not able to communicate with the answer message received from the terminal.

* * * * *